US008846814B2

(12) United States Patent
Becker et al.

(10) Patent No.: US 8,846,814 B2
(45) Date of Patent: *Sep. 30, 2014

(54) USE OF POLYOLEFINS HAVING ISOTACTIC STRUCTURAL ELEMENTS IN FLOORING MATERIALS

(75) Inventors: Hinnerk Gordon Becker, Essen (DE); Marlies Vey, Marl (DE); Lutz Mindach, Bochum (DE)

(73) Assignee: Evonik Degussa GmbH, Essen (DE)

( * ) Notice: Subject to any disclaimer, the term of this patent is extended or adjusted under 35 U.S.C. 154(b) by 322 days.

This patent is subject to a terminal disclaimer.

(21) Appl. No.: 12/863,716

(22) PCT Filed: Jan. 22, 2009

(86) PCT No.: PCT/EP2009/050688
§ 371 (c)(1),
(2), (4) Date: Jul. 20, 2010

(87) PCT Pub. No.: WO2009/092748
PCT Pub. Date: Jul. 30, 2009

(65) Prior Publication Data
US 2010/0285246 A1    Nov. 11, 2010

(30) Foreign Application Priority Data

Jan. 24, 2008   (DE) .................. 10 2008 005 949

(51) Int. Cl.
| | | |
|---|---|---|
| C08F 210/02 | (2006.01) | |
| C08F 210/06 | (2006.01) | |
| C08F 210/08 | (2006.01) | |
| C08L 23/04 | (2006.01) | |
| C08L 23/20 | (2006.01) | |
| C08F 10/00 | (2006.01) | |
| C08L 23/14 | (2006.01) | |
| D06N 7/00 | (2006.01) | |
| C09J 123/14 | (2006.01) | |
| C09D 123/14 | (2006.01) | |
| C08L 23/18 | (2006.01) | |

(52) U.S. Cl.
CPC .............. *C08L 23/142* (2013.01); *C08F 10/00* (2013.01); *D06N 7/0036* (2013.01); *C09J 123/142* (2013.01); *C09D 123/142* (2013.01); *C08L 23/18* (2013.01); *C08L 2314/06* (2013.01)
USPC ........................... 525/232; 525/240; 526/348

(58) Field of Classification Search
USPC ................... 526/72, 126, 348; 525/232, 240
See application file for complete search history.

(56) References Cited

U.S. PATENT DOCUMENTS

| 7,014,886 | B2 | 3/2006 | Vey et al. | |
| 8,530,582 | B2 * | 9/2013 | Becker et al. ................ | 525/242 |
| 2003/0069320 | A1 * | 4/2003 | Minami et al. ................ | 521/142 |
| 2004/0253410 | A1 * | 12/2004 | Higgins et al. ................ | 428/96 |
| 2004/0260040 | A1 * | 12/2004 | Resconi ........................ | 526/127 |
| 2005/0209439 | A1 * | 9/2005 | Bell ............................... | 528/480 |
| 2007/0039679 | A1 * | 2/2007 | Urban et al. ................... | 156/71 |
| 2007/0299223 | A1 * | 12/2007 | Resconi et al. ............... | 526/170 |
| 2008/0194765 | A1 | 8/2008 | Becker et al. | |
| 2008/0213515 | A1 | 9/2008 | Vey et al. | |
| 2008/0214757 | A1 | 9/2008 | Becker et al. | |
| 2008/0227919 | A9 * | 9/2008 | Li et al. ......................... | 525/240 |

FOREIGN PATENT DOCUMENTS

| WO | 2006 069205 | 6/2006 |
| WO | WO 2009/112351 | * 9/2009 |

OTHER PUBLICATIONS

International Search Report issued Jul. 30, 2009 in PCT/EP09/050688 filed Jan. 22, 2009.
U.S. Appl. No. 12/746,091, filed Jun. 3, 2010, Becker, et al.
U.S. Appl. No. 12/830,628, filed Jul. 6, 2010, Becker, et al.
U.S. Appl. No. 12/830,869, filed Jul. 6, 2010, Becker, et al.
U.S. Appl. No. 12/830,889, filed Jul. 6, 2010, Becker, et al.
U.S. Appl. No. 12/990,955, filed Nov. 4, 2010, Becker, et al.
U.S. Appl. No. 12/992,792, filed Nov. 15, 2010, Becker, et al.
Chinese Office Action issued Apr. 30, 2014 in connection with corresponding Chinese Patent Application No. 200910203938.2, filed Jan. 24, 2009.

* cited by examiner

*Primary Examiner* — Jeffrey Mullis
(74) *Attorney, Agent, or Firm* — Oblon, Spivak, McClelland, Maier & Neustadt, L.L.P.

(57) ABSTRACT

The present invention relates to the use of polyolefins having isotactic structural elements in floor coverings, in particular in carpets or artificial lawns.

17 Claims, 6 Drawing Sheets

*Example of monomodal molar mass distribution (polymer from experiment 21):*

Example of bimodal molar mass distribution (polymer from experiment 19):

Example of thermogram having a different number of melting peaks in the first and second heating curves and cold crystallization (polymer from experiment 7)

*Example of the frequency dependence of complex viscosity, storage modulus and loss modulus of a polyolefin used according to the invention with dominance of the loss modulus in the frequency range examined (polymer from experiment 13) at 150°C:*

*Example of the frequency dependence of complex viscosity, storage modulus and loss modulus of a polyolefin which is not used according to the invention with dominance of the storage modulus in the frequency range examined (polymer: Elastoflex P1023PI) at 150°C:*

*Example of the temperature dependence of complex viscosity, storage modulus and loss modulus of a polyolefin used according to the invention (polymer from experiment 13) in the range from 250 to 25°C with dominance of the loss modulus in the temperature range examined:*

USE OF POLYOLEFINS HAVING ISOTACTIC STRUCTURAL ELEMENTS IN FLOORING MATERIALS

The present invention relates to the use of polyolefins having isotactic structural elements in floor coverings, in particular in carpets or artificial lawns.

The use of amorphous olefin polymers for producing carpets and/or carpet nonwovens has been known for a long time. Thus, for example, U.S. Pat. No. 3,928,281 describes the use of a combination of atactic polypropylene and urethane prepolymers and also inorganic filler materials for producing a carpet rear-side backing. The use of isocyanate-containing compounds in carpet production is disadvantageous with regard to the recycleability of such carpets and for toxicological reasons. In addition, the atactic polypropylene used does not have the materials properties required for simultaneous nap and filament binding, e.g. a defined polymer structure. In particular, low application weights cannot be achieved.

The use of hot melt adhesives for producing carpet rear-side coatings is already known from U.S. Pat. No. 3,551,231. The hot melt adhesives used are produced, in particular, on the basis of poly(ethylene-co-vinyl acetate) and pressed into the raw carpets by means of a particular pressing mechanism. However, the base polymers used do not have the materials properties required for simultaneous nap and filament binding; in particular, low application weights cannot be achieved.

U.S. Pat. No. 3,982,051 describes the use of hot melt adhesives for carpet rear-side coating. Here, the hot melt adhesives are produced on the basis of ethylene copolymers having a high ethylene content, e.g. poly(ethylene-co-vinyl acetate), poly(ethylene-co-alkyl acrylate), atactic polypropylene and vulcanized rubber. The combination of materials used does not have the materials properties required for simultaneous nap and filament binding; in particular, low application weights cannot be achieved.

EP 0518014 describes three-dimensionally deformable recycleable floor carpets, in particular automobile floor carpets, and also a process for producing them, in which the rear-side coating of the carpet is carried out using a moulding composition containing from 10 to 95% by weight of one or more largely amorphous polyolefins. The largely amorphous polyolefin used has a melt viscosity at 190° C. of from 2000 to 200000 mPa*s and a softening point of from 70 to 160° C. and also a needle penetration of from 5 to 50*0.1 mm. In particular, the production of a carpet rear-side coating using a high to very high filler content is described. Simultaneous nap and/or filament binding is not described. The amorphous polyolefins mentioned are, owing to their sometimes very high melt viscosity, unable to ensure sufficient penetration of the raw carpet. In particular, the necessary combination of low melt viscosity at the application temperature and high tensile strength, flexibility and adhesive shear strength in the cooled state is not ensured.

EP 0592683 describes a two-stage process for producing carpet nonwovens using amorphous polyolefins, in which the polymer composition applied has a melt viscosity of from 2000 to 100000 centipoise and an application weight of from 200 to 2000 g/m² is used. The amorphous olefin polymers present in the polymer composition (5-95% by mass) are homopolymers and/or copolymers of ethylene, propylene and/or 1-butene which are essentially amorphous and have no crystallinity. They have a melt viscosity of from 300 to 30000 centipoise and a softening point of from 100 to 170° C. However, such amorphous polymers do not have good materials properties and also do not make it possible to produce carpets with a low application weight. In particular they do not make it possible for a high adhesive shear strength on untreated polypropylene, a high tensile strength and a high elongation at break to be achieved at the same time as a low melt viscosity. In addition, such amorphous polyolefins generally have a high polydispersity and the low molecular weight constituents present in them are easily given off as gases. Furthermore, the production process described has considerable process engineering disadvantages which make the economics of the process questionable as a result of its two-stage nature (separate nap/filament binding and carpet rear-side coating).

A process for nap and filament binding using hot melt adhesives based on amorphous poly(1-olefins) is also known from EP 1375731. However, the amorphous poly(1-olefin)s used there have a melt viscosity of from 2000 to 200000 mPa*s at 190° C. and therefore largely a poor flowability, as a result of which it is difficult to produce strong composites at low application weights. In addition, in the case of the amorphous poly(1-olefins) indicated, a combination of low viscosity, high tensile strength and good adhesive shear strength on untreated polypropylene is not ensured, so that a comprehensive and complex formulation of the amorphous poly(1-olefins) is always necessary to achieve an industrially satisfactory solution.

In general, polyolefins are frequently used for producing floor coverings, in particular carpets. Thus, for example, WO 93/12285 describes fully recyclable tuft carpets based on synthetic thermoplastic polymers, in which, in particular, all constituents of the tuft carpets belong to one polymer family. In addition to polyamides or polyesters, the use of polypropylene is also explicitly described here. In particular, hot melt adhesives based on synthetic thermoplastic polymers, which in the case of polypropylene carpets are formulated on the basis of atactic polypropylene, are used. A combination of low viscosity, high tensile strength and good adhesive shear strength on untreated polypropylene is, however, not ensured when using atactic polypropylene, so that a comprehensive and complex formulation is always necessary for an industrially satisfactory solution.

Furthermore, WO 98/38374, WO 98/38375 and US 2005/0266206, for example, describe the use of homogeneously branched polyethylene (e.g. poly(ethylene-co-1-octene)) having a high molecular weight for the production of carpet rear-side coatings. However, such polymers have, owing to their high melt viscosity at customary processing temperatures, a poor penetration behaviour in respect of the carpet backing material and also, owing to their branches, generally underdeveloped flow properties.

WO 2000/22226 describes the use of specific (1-olefin) copolymers for carpet production. Comonomers used are, in particular, vinylaromatic or sterically hindered cycloaliphatic comonomers. In particular, the polymers used are poly(ethylene-co-styrene). The polymers used have, in particular, a high molar mass and are, according to the examples, processed at very high melt temperatures of >450° C. The poly(ethylene-co-styrene) polymers described are very complicated to prepare and process; in particular, the removal of styrene which has not been incorporated into the polymer presents problems whose solution requires a high technological outlay and makes the process economically uninteresting. The very high melt temperatures (which are necessary, inter alia, because of the high molar masses) are also prohibitive for the processing of thermally sensitive raw carpets.

The use of metallocene compounds as catalyst in olefin polymerization has likewise been known for a long time. Kaminsky et al. have shown that the catalyst system cyclopentadienylzirconium dichloride/methylaluminoxane (Cp$_2$ZrCl$_2$/MAO) is very suitable for polymerization (*Adv. Organomet. Chem.* 1980, 18, 99-149). The MAO use, viz. methylaluminoxane (a partial hydrolysis product of trimethylaluminium), functions as cocatalyst. Since this time, the use of metallocene compounds in conjunction with MAO in polymerization reactions has become widespread. Thus, there are many publications concerned with the metallocene-catalyzed polymerization of olefins, for example of propene, e.g. U.S. Pat. No. 6,121,377, EP 584 609, EP 516 018, WO 2000/037514, WO 2001/46274 and US 2004/0110910.

In the polymerization of propene or its higher homologs, formation of different relative stereoisomers can occur. The regularity with which the configurative repeating units follow one another in the main chain of a macromolecule is referred to as tacticity. To determine the tacticity, the monomer units of a polymer chain are examined and the relative configuration of each (pseudo)asymmetric chain atom relative to the preceding one is determined. The term isotacticity is used when the observed relative configuration of all (pseudo)asymmetric chain atoms is always the same, i.e. the chain is made up of only one configurative repeating unit. On the other hand, the term syndiotacticity is used when the relative configuration of successive (pseudo)asymmetric chain atoms is in each case the opposite. i.e. the chain is made up of two different configurative repeating units which alternate.

Finally, in the case of atactic polymers, the different configurative repeating units along the chain are arranged randomly.

The physical properties of propylene polymers are dependent first and foremost on the structure of the macromolecules and thus also on the crystallinity, their molecular weight and the molecular weight distribution and can be influenced by the polymerization process used and, in particular, the polymerization catalyst used [R. Vieweg, A. Schley, A. Schwarz (editors); Kunststoff Handbuch; vol. IV/"Polyolefine"; C. Hanser Verlag, Munich 1969].

Polypropylene polymers are therefore classified according to their tacticity into atactic, isotactic and syndiotactic polymers. In addition, there are the special forms of hemiisotactic polypropylene polymers and stereoblock polymers. The latter are usually polymers having isotactic and atactic stereoblocks and behave like thermoplastic elastomers since physical crosslinking of the polymer chains takes place and leads to a joining of different crystalline polymer regions (A. F. Mason, G. W. Coates in: "Macromolecular Engineering"; Wiley-VCH, Weinheim; 2007).

Atactic polypropylene has a low softening point, a low density and good solubility in organic solvents. Classical atactic polypropylene (aPP) has a very broad molecular weight distribution which firstly leads to a broad melting range and secondly results in a high proportion of low molecular weight material which has a more or less strong tendency to migrate. aPP has a very low tensile strength of about 1 MPa, but on the other hand has a very high elongation at break of up to 2000% (H.-G. Elias; Makromoleküle; vol. III; Wiley-VCH; Weinheim; 2001). Owing to the low softening point, the heat distortion resistance of aPP formulations is correspondingly low, which leads to severe limitation of the field of use. Pure atactic polypropylene polymers can also be prepared by metallocene catalysis, with both very low molecular weight polymers and relatively high molecular weight polymers being able to be obtained (L. Resconi in: "Metallocene based Polyolefins"; J. Scheirs, W. Kaminsky (editors); J. Wiley & Sons; Weinheim; 1999).

Syndiotactic polypropylene is highly transparent and displays good heat resistance, and the melting point is below that of isotactic polypropylene. It has high rupture strengths at a moderate elongation at break (A. F. Mason, G. W. Coates in "Macromolecular Engineering"; Wiley-VCH, Weinheim; 2007). A disadvantage is the slow crystallization from the melt observed in many cases. Owing to physical entanglement, the melt viscosity of syndiotactic polypropylene of comparable molar mass is significantly higher than that of isotactic polypropylene, i.e. the same melt viscosity can be achieved at significantly lower molar masses. Syndiotactic and isotactic polypropylene are immiscible above a particular molar mass, and corresponding polymer blends tend to undergo phase separation. Polymer blends of syndiotactic polypropylene with other polyolefins display a significantly higher elongation at break than blends containing isotactic polypropylene (T. Shiomura, N. Uchikawa, T. Asanuma, R. Sugimoto, I. Fujio, S. Kimura, S. Harima, M. Akiyama, M. Kohno, N. Inoue in: "Metallocene based Polyolefins"; J. Scheirs, W. Kaminsky (editors); J. Wiley & Sons; Weinheim; 1999). Classical heterogeneous Ziegler-Natta catalysts are not able to produce a syndiotactic polypropylene.

Isotactic polypropylene has a high melting point and a good tensile strength. 100% isotactic polypropylene has a calculated melting point of 185° C. and an enthalpy of fusion of about 207 J/g (J. Bicerano; J.M.S.; Rev. Macromol. Chem. Phys.; C38 (1998); 391ff). However, as homopolymer it has a relatively low-temperature resistance and a high brittleness and poor heat sealability or weldability. The tensile strength (rupture) is about 30 MPa, and the elongation at break is virtually zero. Improved materials properties can be obtained by copolymerization or terpolymerization with ethylene and 1-butene, with the comonomer content of copolymers with ethylene usually being <8% by mass and for terpolymers with ethylene and 1-butene usually being <12% by mass. (H.-G. Elias; Makromoleküle; vol. III; Wiley-VCH; Weinheim; 2001). At the same MFR (Melt Flow Rate), isotactic polypropylene which has been produced by classical heterogeneous Ziegler-Natta catalysis has a significantly lower pseudoplasticity then polypropylene which has been prepared by metallocene catalysis. The impact toughness of the metallocene-based polymer is above that of the Ziegler-Natta material over a wide molar mass range. The proportion of xylene-soluble constituents in isotactic poly(propylene) homopolymer which has been obtained by metallocene catalysis is usually significantly <1% by mass, while in the case of random copolymers with ethylene xylene-soluble contents of up to 5% by mass, depending on the ethylene content, have been found (W. Spaleck in: "Metallocene based Polyolefins"; J. Scheirs, W. Kaminsky (editors); J. Wiley & Sons; Weinheim; 1999).

Since the solubility of polypropylene depends both on the molecular weight and on its crystallinity corresponding fractionation can be carried out by means of dissolution experiments [A. Lehtinen; Macromol. Chem. Phys.; 195(1994); 1539ff].

It has been known for a long time that amorphous atactic fractions [J. Boor; "Ziegler-Natta Catalysts and Polymerization"; Academic Press; New York; 1979] and low molecular weight fractions having a low crystallinity [G. Natta, I. Pasquon, A. Zambelli, G. Gatti; Makromol. Chem.; 70 (1964); 191ff] can be obtained from polypropylene polymers by extraction with ether. Highly crystalline isotactic polymers, on the other hand, have a very low solubility both in aliphatic solvents and also in ethers, even at elevated temperature [B. A. Krentsel, Y. V. Kissin, V. I. Kleiner, L. L. Stotskaya; "Polymers and Copolymers of higher 1-Olefins"; p. 19/20; Hanser Publ.; Munich; 1997]. The soluble polymer components generally have no or only very low crystallinity and do not display a melting point [Y. V. Kissin; "Isospecific polymerization of olefins"; Springer Verlag; New York; 1985]. Polypropylene oligomers soluble in tetrahydrofuran have very low number average molar masses of significantly less than 1500 g/mol [H. El Mansouri, N. Yagoubi, D. Scholler, A. Feigenbaum, D. Ferrier; J. Appl. Polym. Sci.; 71 (1999); 371ff].

The various types of polymer differ substantially in their materials properties. The crystallinity of highly isotactic or syndiotactic polymers is very high because of their high order. Atactic polymers, on the other hand, have a higher amorphous content and accordingly a lower crystallinity. Polymers having a high crystallinity display many materials properties which are undesirable, especially in the field of hot melt adhesives. Thus, for example, a high crystallinity in low molecular weight polymers leads to very rapid crystallization with open times ("open time"=period of time during which the parts to be adhesively bonded can be joined to one another) of sometimes less than one second. This leads during application (e.g. nozzle application by spraying) to blockage of the application equipment used, even in the case of very low temperature fluctuations, and thus to very poor process stability. In addition, there is the extremely short period of time during which joining of the adhesive bond can be carried out after application. Highly crystalline polymers are also hard, brittle and have only a very low flexibility at room temperature, which is likewise undesirable in the case of adhesive bonds. In addition, very high quantities of energy are required at the point of application or over the entire line system to achieve melting of highly crystalline polymers, which apart from the economic effects also has adverse consequences for the processability.

Highly isotactic or syndiotactic polypropylene homopolymers or copolymers with ethylene and/or higher olefins, as described in the publications mentioned, are unsuitable for use as hot melt adhesives or adhesive raw materials.

WO 01/46278 describes 1-olefin copolymers which have predominantly amorphous character and are obtained by metallocene catalysis. When they are used as hot melt adhesives, no or only minimal additions of adhesive resins are said to be necessary. The copolymers are composed of A: from 60 to 94% of a $C_3$-$C_6$ 1-olefin, B: 6-40 mol % of one or more $C_4$-$C_{10}$ 1-olefins and optionally C: 0-10 mol % of another unsaturated monomer (preferably ethylene). The random distribution of the comonomer B has a particularly strong disruptive effect on the crystallinity of the polymers since only few regions now reach the minimum block length necessary for crystallization (see, for example, B. S. Davison, G. L. Taylor; Br. Polym. J.; 4 (1972); 65ff). This can also be seen, inter alia, from the low melting point of the polymers described. Largely amorphous polymers also have a very unbalanced materials behaviour. In particular, the cohesion of such polymers is significantly underdeveloped in comparison to adhesion, resulting in cohesive failures frequently occurring when they are used for adhesive bonding. Such polymers having a low melting point also lead to poor heat resistance in adhesive bonds, which rules out numerous fields of use. In addition, comonomers having more than four carbon atoms are very expensive, which makes the products uneconomical in terms of their fields of use and the product prices to be achieved there. Freedom from aromatics is difficult to guarantee by means of the product process described, especially since polymerization is preferably carried out in aromatic solvents and the cocatalyst used does not dissolve in aliphatic solvents. The high reaction temperatures, which are (sometimes very far) above the melting point of the polymers produced lead to very high reaction pressures which make economical operation of the polymerization process difficult. In addition, many monomers according to the invention are present in the supercritical state in wide parts of the process window indicated ($T_R$=40-250° C., $p_R$=10-3000 bar), which requires a high engineering outlay for controlling the process and further restricts the economics of the process.

There is therefore a need for floor coverings having improved properties. This object is surprisingly achieved by the present invention.

SUMMARY OF THE INVENTION

The present invention firstly provides for the use of polyolefins in floor coverings, wherein the polyolefins contain not more than 20% by mass of ethylene, either 70-100% by mass or not more than 20% by mass of propylene and/or either 80-100% by mass or not more than 25% by mass of 1-butene, with the sum of the proportions being 100% by mass, and the triad distribution for propene triads determined by $^{13}$C-NMR has an isotactic proportion of 75-98% by mass, a syndiotactic proportion of not more than 20% by mass, an atactic proportion of less than 20% by mass and/or the triad distribution for 1-butene triads determined by $^{13}$C-NMR has an isotactic proportion of not more than 98% by mass and an atactic proportion of 1-85% by mass. The polyolefins mentioned are used, in particular, as or in adhesives in the floor coverings.

Figure 1:
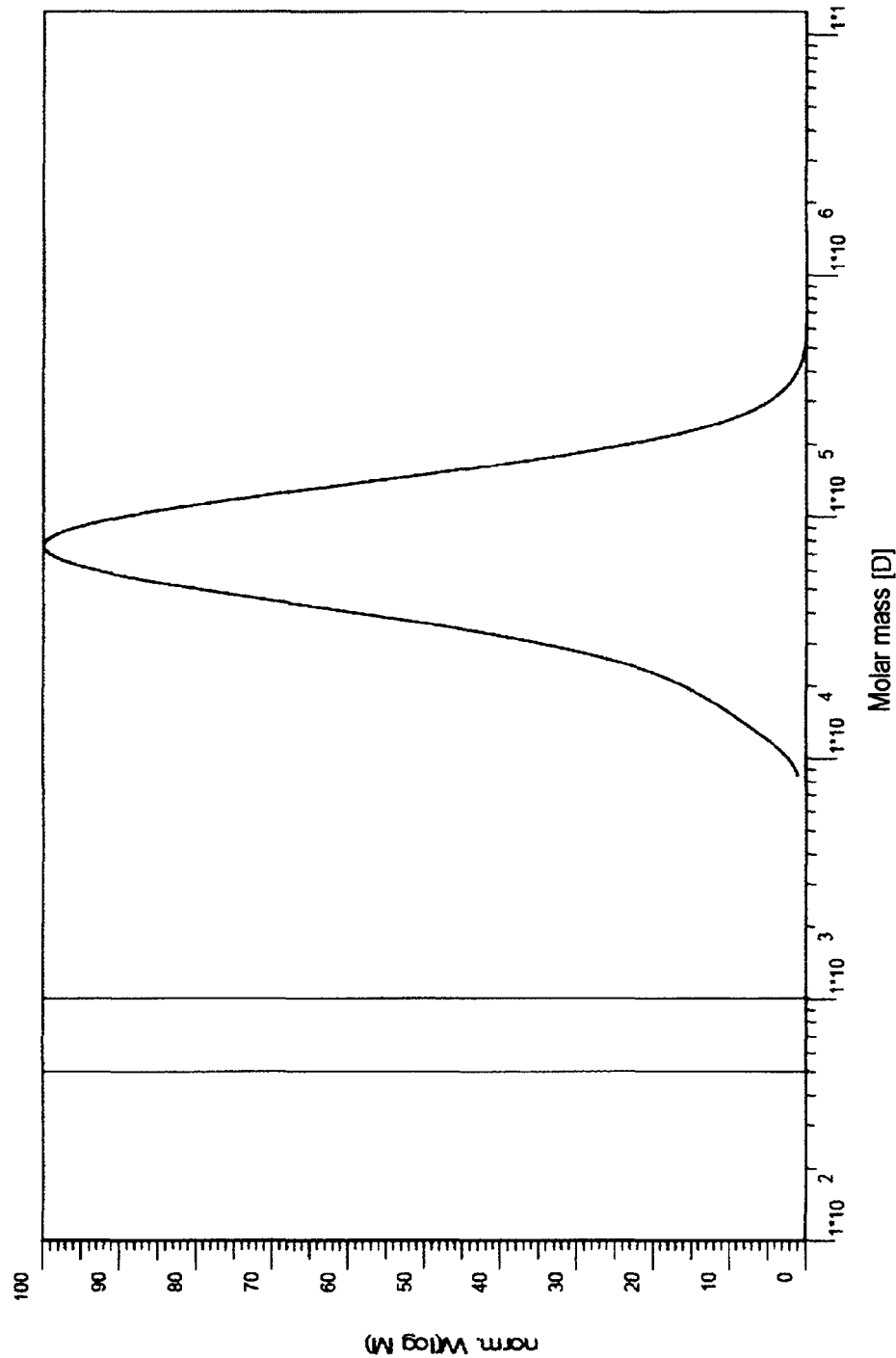
FIG. 1 shows an example of monomodal molar mass distribution of the examples.
Figure 2:
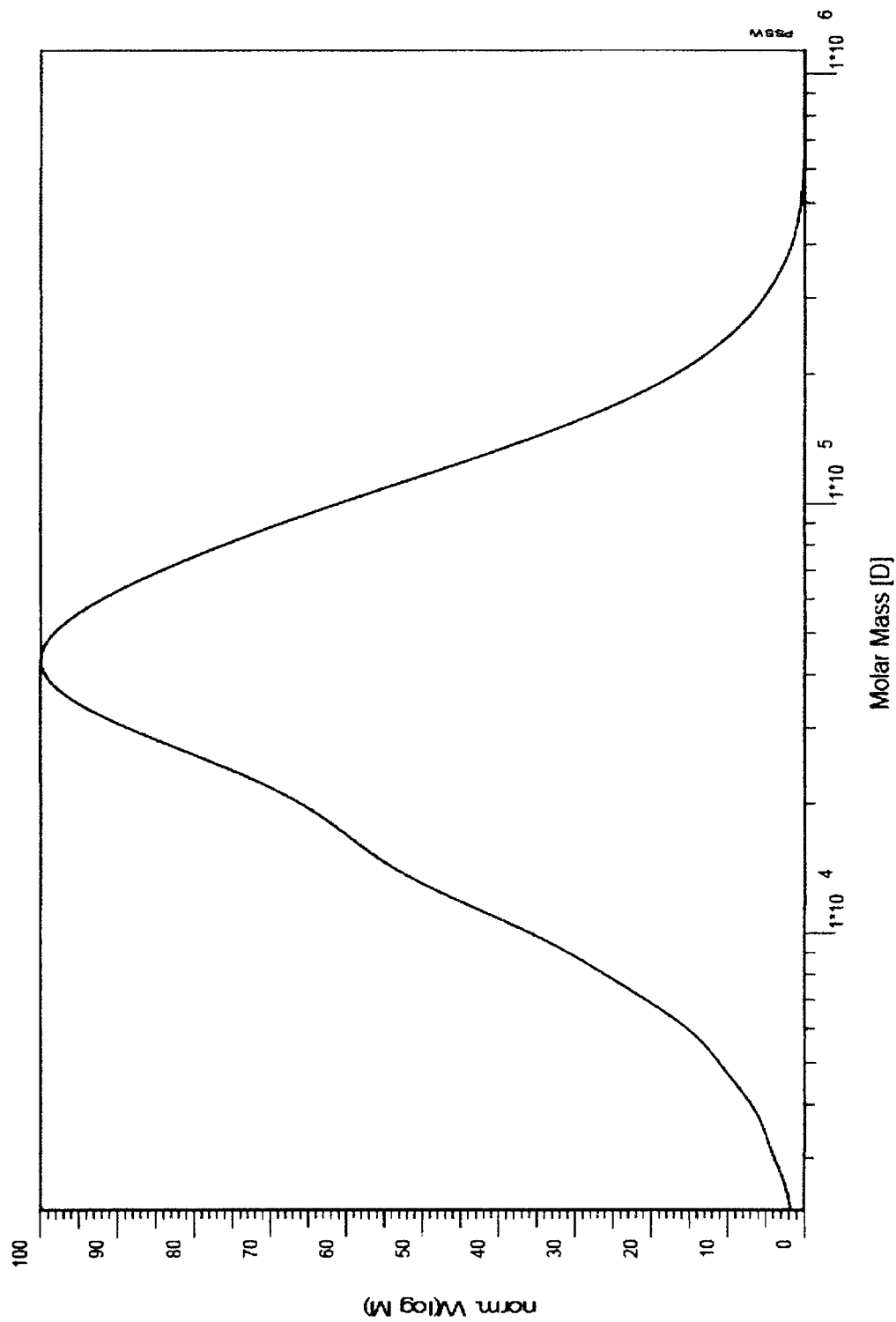
FIG. 2 shows an example of bimodal molar mass distribution from the examples.
Figure 3:
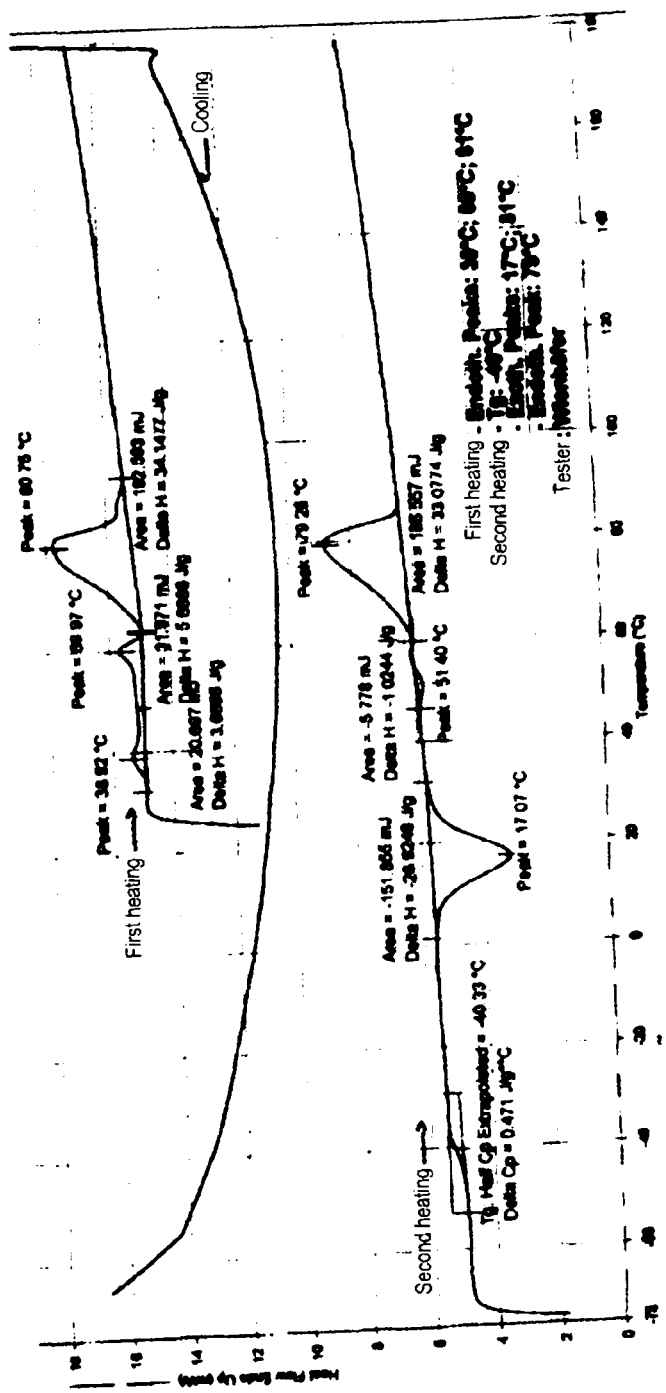
FIG. 3 shows a thermogram of a polyolefin composition having a different number of melting peaks.
Figure 4:
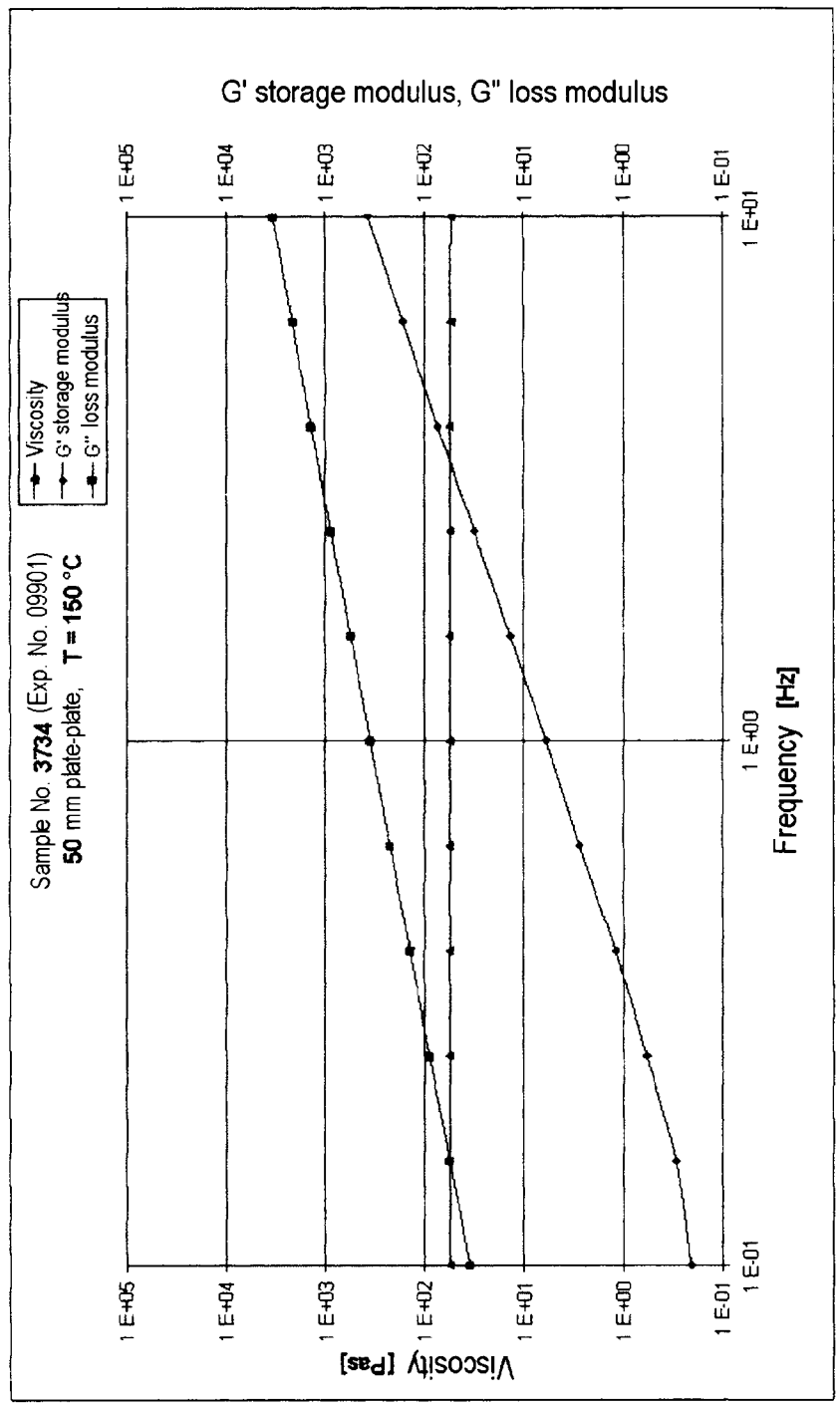
FIG. 4 shows a relationship between complex viscosity, storage modulus and loss modulus in an embodiment of the invention.
Figure 5:
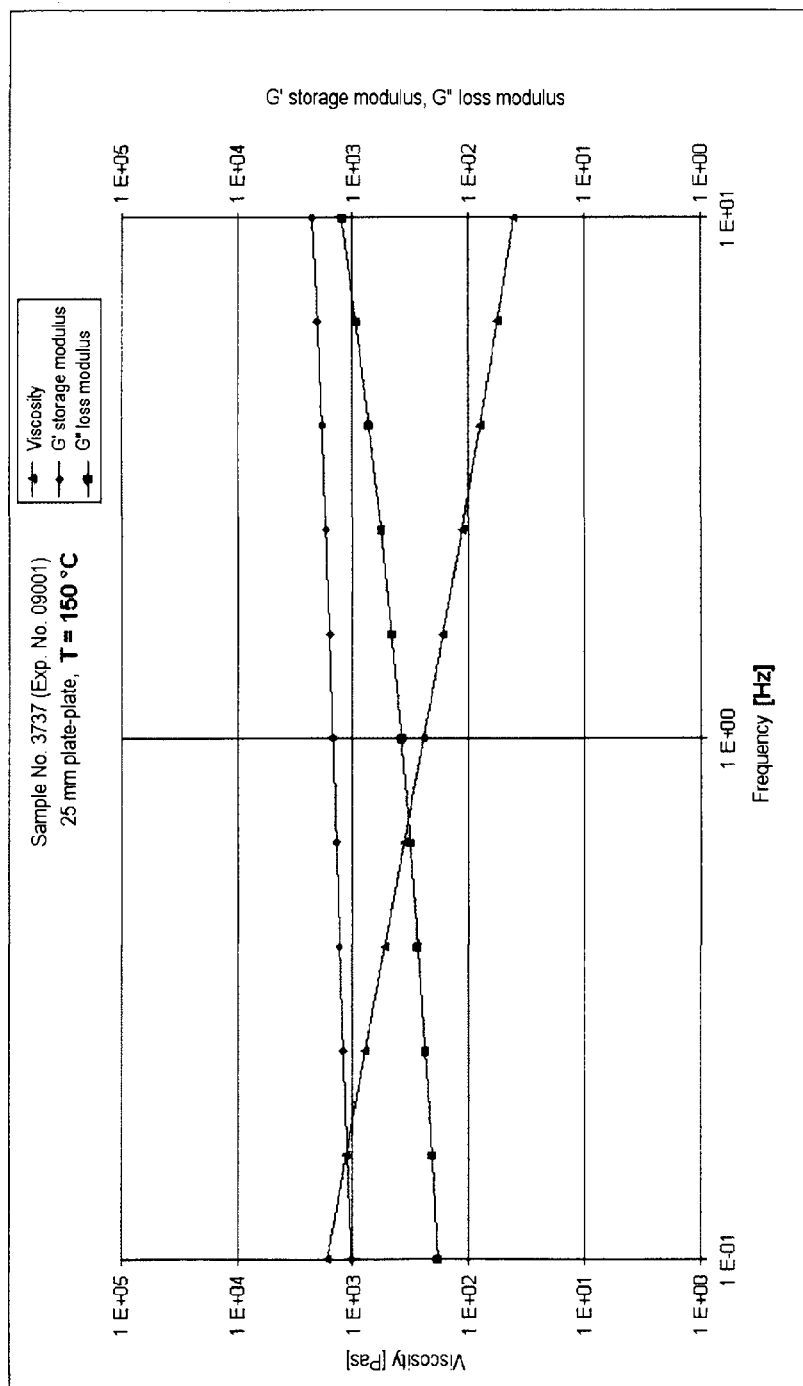
FIG. 5 shows the relationship between complex viscosity, storage modulus and loss modulus.
Figure 6:
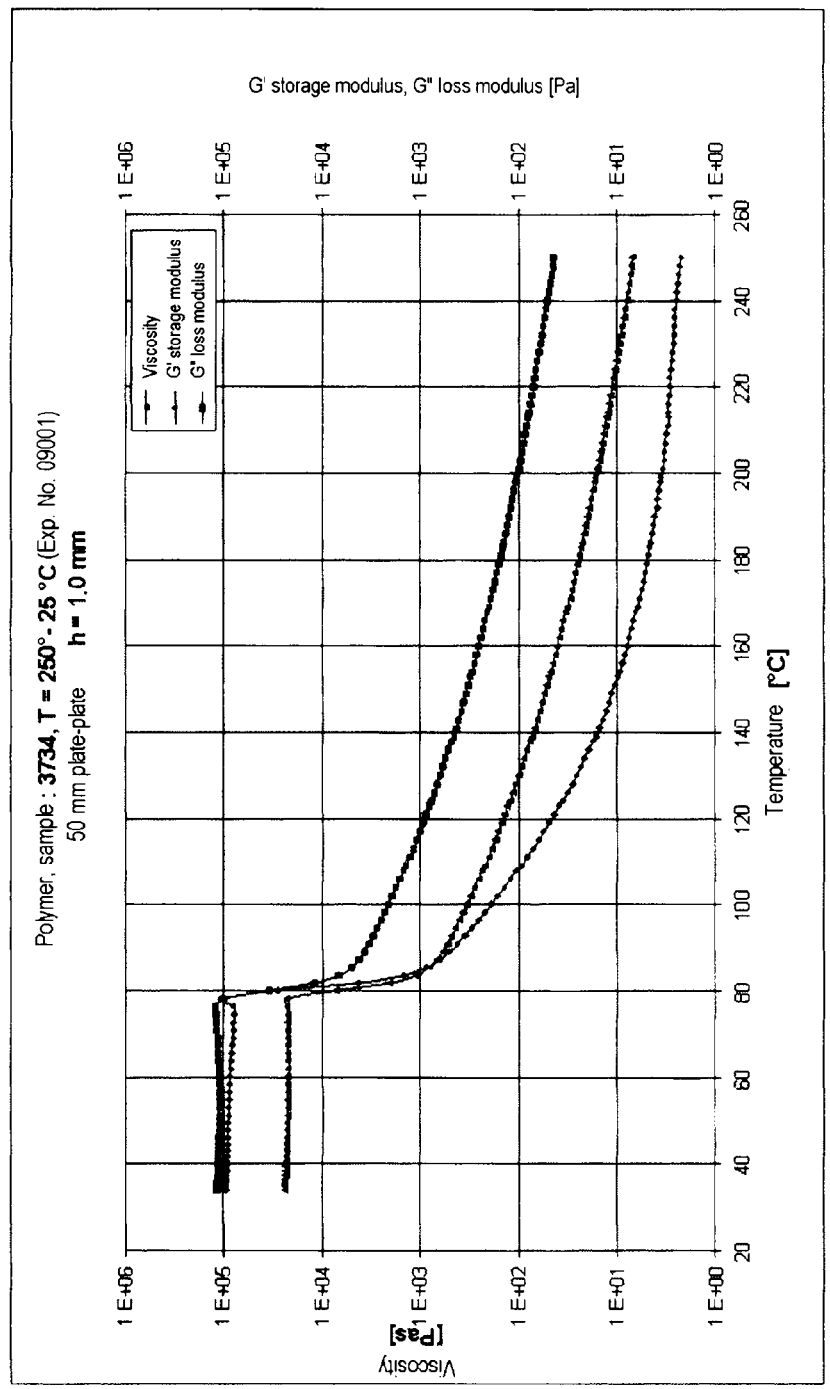
FIG. 6 shows a relationship between temperature of complex viscosity, storage modulus and loss modulus from the examples.

The polyolefins are particularly preferably used for nap and filament binding and/or for rear-side coating.

When used in floor coverings, the polyolefins used according to the invention have the advantage that a property combination of low melt viscosity, high tensile strength, high flexibility/elongation at break and high adhesive shear strength on untreated polyolefin surfaces, in particular on untreated polyethylene and/or polypropylene, which combination is particularly advantageous for the intended application can be achieved by means of them. In particular, the low melt viscosity provides good and complete penetration of the raw carpet by the melt adhesive, which leads to particularly good nap or filament or fibre binding. At the same time, the high tensile strength and the high adhesive shear strength on untreated polyolefins in combination with the high flexibility/elongation at break allows particularly low application weights, which makes the production process and the floor covering produced thereby particularly economical.

The floor coverings according to the invention are preferably textile or nontextile coverings; the nontextile coverings are, in particular, elastic coverings. The coverings are very particularly preferably carpets or artificial lawns; these can be all types of carpets (e.g. tufted pile carpets, non-tufted pile carpets, tufted nonwoven carpets, etc.) and artifical lawns known to those skilled in the art.

In the polyolefins used, the triad distribution for propene triads determined by $^{13}$C-NMR (with the proviso that the polymer contains propene triads) preferably has an isotactic proportion of 75-98% by mass, preferably 77-97% by mass, particularly preferably 79-96% by mass and in particular from 80-95% by mass, based on the propene triads.

This gives the polyolefins used a high degree of cohesion without being hard and brittle.

It is likewise preferred that the triad distribution for propene triads determined by $^{13}$C-NMR in the polyolefins (with the proviso that the polymer contains propene triads) has an atactic proportion of not more than 20% by mass, preferably 1-18% by mass, particularly preferably 2-16% by mass and in particular 3-15% by mass, based on the propene triads.

This gives the polyolefins used increased adhesion and a satisfactory flexibility in addition to the dominant cohesive materials properties.

The triad distribution for propene triads determined by $^{13}$C-NMR (with the proviso that the polymer contains propene triads) preferably has a syndiotactic proportion of not more than 20% by mass, preferably 1-18% by mass, particularly preferably 2-16% by mass and in particular 3-15% by mass, based on the propene triads.

This gives the polyolefins used a high elasticity in addition to the cohesive and adhesive materials properties, and they display optimal spreading when applied as a melt. In addition, they have improved transparency.

In a particularly preferred embodiment of the polyolefins used, the triad distribution for propene triads determined by $^{13}$C-NMR (with the proviso that the polymer contains isotactic and atactic propene triads) has a ratio of isotactic to atactic propene triads in the range from 1:0.005 to 1:0.5, preferably from 1:0.01 to 1:0.45, particularly preferably from 1:0.015 to 1:0.40 and very particularly preferably from 1:0.02 to 1:0.37. This gives the polyolefins used an optimal balance of dominant cohesive and adhesive materials properties.

The triad distribution for 1-butene triads determined by $^{13}$C-NMR (with the proviso that the polymer contains 1-butene triads) particularly preferably has a syndiotactic proportion of not more than 25% by mass, preferably 1-22% by mass, particularly preferably 2-20% by mass and in particular 3-19% by mass, based on the 1-butene triads, wherein in the case of 0% by mass of syndiotactic 1-butene triads being present, the polymer has up to 5-85% by mass of atactic triads. This also gives the polyolefins used an optimal wetting behaviour in addition to good flexibility, and they additionally display optimal spreading when applied as a melt. In addition, they have improved transparency.

Preference is also given to the triad distribution for 1-butene triads determined by $^{13}$C-NMR (with the proviso that the polymer contains 1-butene triads) having an atactic proportion of 1-90% by mass, preferably 2-85% by mass, particularly preferably 3-82% by mass and in particular 5-80% by mass, based on the 1-butene triads.

This enables longer open times to be achieved with the polyolefins used as a result of slowed crystallization and thus enables the setting properties to be matched to prevailing requirements.

Preference is also given to the triad distribution for 1-butene triads determined by $^{13}$C-NMR (with the proviso that the polymer contains 1-butene triads) having an isotactic proportion of 10-98% by mass, prefrably 15-97% by mass, particularly preferably 17-96% by mass and in particular 19-95% by mass, based on the 1-butene triads.

Preference is additionally given to the triad distribution determined by $^{13}$C-NMR in the examination of poly(ethylene-co-propylene-co-1-butene)-terpolymers prepared according to the invention and having ethylene contents of up to 15% by mass having a proportion of ethylene triads of <6% by mass, preferably 0.5-5% by mass, particularly preferably 0.6-4% by mass, very particularly preferably 0.7-3.5% by mass, based on the ethylene content, so that although random incorporation of the monomer ethylene dominates, a particular proportion of ethylene blocks is present. As a result, the polyolefins used contain not only the relatively rigid isotactic structural units and individual "disrupting monomer units" but also flexible ethylene blocks which themselves make no contribution to the crystallinity of the overall sample but ensure balanced materials properties (stiffness and flexibility).

The polyolefins used preferably contain not more than 20% by mass, more preferably not more than 18% by mass and particularly preferably not more than 15% by mass of ethylene.

In a preferred embodiment of the present invention, the polyolefins used contain 100% by mass of propylene or 1-butene.

In a further preferred embodiment of the present invention, the polyolefins used are in particular copolymers of ethylene, propylene and/or 1-butene, with the copolymers containing not more than 20% by mass, preferably not more than 18% by mass, particularly preferably not more than 15% by mass, of ethylene. As regards the proportion of propylene and butene, there are a number of alternative possibilities. The propylene content is either 70-98% by mass, preferably 72-95% by mass, or not more than 20% by mass, preferably 1-18% by mass and particularly preferably 2-16% by mass. The butene content is either 80-98% by mass, preferably 82-96% by mass, or not more than 25% by mass, preferably 1-22% by mass and particularly preferably 2-20% by mass. The total proportion of all comonomers mentioned has to be 100% by mass, i.e. the polyolefins used are either relatively rich in propylene or relatively rich in butene, with the monomers mentioned being able to be combined with one another as desired, i.e. propylene with butene and/or ethylene.

In particular, the polyolefins used are poly(ethylene-co-propylene) copolymers have an ethylene content of not more than 20% by mass, poly(ethylene-co-1-butene) copolymers having an ethylene content of not more than 15% by mass, poly(propylene-co-1-butene) copolymers having a propylene content of 2-20 or 80-98% by mass or poly(ethylene-co-propylene-co-1-butene) terpolymers having an ethylene content of not more than 20% by mass.

In a particular embodiment of the present invention, the copolymers contain propylene, 1-butene and/or ethylene and also a branched olefin selected from the group consisting of 3-methyl-1-butene, 3-methyl-1-hexene, 3-methyl-1-heptene, 4-methyl-1-pentene and 6-methyl-1-heptene, with the maximum proportion of the branched 1-olefin in the copolymer being not more than 50% by mass, preferably not more than 40% by mass and particularly preferably not more than 30% by mass.

In the likewise preferred case of a terpolymer, this contains, in particular, ethylene, propylene and 1-butene, with one of the three comonomers having a proportion of at least 75% by mass while the other two monomers together make up a proportion of 25% by mass. The terpolymers contain a proportion of not more than 20% by mass, preferably not more than 18% by mass, particularly preferably not more than 15% by mass, of ethylene.

The following subcombinations are very particularly preferred for the abovementioned copolymers and terpolymers: poly(ethylene-co-propylene), poly(ethylene-co-1-butene), poly(propylene-co-1-butene), poly(propylene-co-3-methyl- 1-butene), poly(1-butene-co-3-methyl-1-butene), poly(propylene-co-3-methyl-1-hexene), poly(propylene-co-3-methyl-1-heptene), poly(ethylene-co-propylene-co-1-butene) and poly(ethylene-co-propylene-co-3-methyl-1-butene).

The polyolefins used are, after appropriate finishing, preferably in the form of a powder, in the form of pellets or in the form of granules. Direct further processing of molten polymer to produce the products according to the invention is likewise possible.

The polyolefins used preferably do not contain any aromatic compounds originating from the polymerization process (i.e. <100 μg/g). Furthermore, they contain essentially no organic halogenated compounds originating from the polymerization process. It is likewise preferred that the polymers (with the exception of the degradation products originating from the catalyst decomposition) contain no contamination by suspending oils (separation media), no residues of inorganic support materials, in particular no inorganic oxides and/or alkaline metal earth halides (e.g. $MgCl_2$), no inorganic or organic boron compounds, no talcites or hydrotalcites and/or their degradation products, no contamination by alcohols, in particular by methanol. This firstly ensures that the polyolefins used are free of toxic compounds and are also suitable in an optimal way for use in sensitive areas such as carpet/floor coverings and/or other applications in automobile interiors, etc. Secondly, the adverse effects which the abovementioned auxiliaries and accompanying substances have on the thermal stability (in particular colour stability) and the adhesive properties of the polymer are ruled out.

The molar mass distribution of the polyolefins used can be monomodal or bimodal, with a narrow molar mass distribution being present even in bimodally distributed polymers.

Polymers having a narrow molar mass distribution have a small variance of the materials properties. They have, for example, clearly defined melting and solidification behaviour. If the molar mass distribution is very narrow, defined melting/solidification behaviour can also be achieved in bimodally distributed polymers, particularly when relatively long open times are required and/or no sharp melting peaks are acceptable (e.g. in the case of long joining times or a fluctuating application temperature).

Furthermore, the polyolefins used have a polydispersity determined by high-temperature gel permeation chromatography with universal calibration of 1.4-4, preferably 1.5-3.5. This range is particularly advantageous, especially for use in the adhesives sector. The crystallization or melting behaviour of polymers, in particular polyolefins, is known to be a function of the molar mass; in the case of linear polyolefins, especially the chain length. Thus, for example, it is known in the case of classical amorphous polyolefins as are used at present in the field of hot melt adhesives, that a polydispersity of 4-6 (or even higher) leads firstly to a very broad melting range and secondly to delayed physical hardening/crystallization. The latter is particularly disadvantageous for hot melt adhesives which are to be used for the production of floor coverings, especially for the production of carpets and artificial lawns, because the polymers therefore have a sometimes extremely long open time (i.e. the time for which the polymer is very sticky as a result of constituents which have not yet crystallized or not yet completely crystallized). Such polymers are unsuitable for processing in carpet production, especially in cases in which the carpet is rolled up directly after application of the hot melt adhesive or the coating composition. An additional disadvantage of the known systems is that polymers having a broad molar mass distribution frequently also display poor tensile strengths as a result of the above-described crystallization deficits, which is likewise undesirable, especially in nap and/or filament binding or carpet rear-side fixing. In general, a broad molar mass distribution is a sign that a polymer mixture (or a polymer blend) rather than a uniform polymer is present, which is known to lead to impairment of the materials properties.

The weight average molar mass of the polyolefins used, determined by high-temperature gel permeation chromatography with universal calibration, is usually in the range from 15000 to 200000 g/mol, preferably from 16000 to 150000 g/mol, particularly preferably in the range from 17000 to 125000 g/mol and very particularly preferably in the range from 18000 to 120000 g/mol. This range is particularly advantageous, especially for use in the adhesives sector. The polyolefins used have, owing to their molar mass and their molar mass distribution, an optimal melt viscosity in the relevant application window, so that optimal wetting of the surfaces to be adhesively bonded can occur. In addition, the relatively low melt viscosity allows penetration into macroscopic and microscopic surface structures, which considerably improves the adhesion of the layer of adhesive. For applications in the field of nap and/or filament binding, the weight average molar mass of at least one of the polyolefins according to the invention present is, in particular, in the range from 10000 to 50000 g/mol, preferably from 10000 to 40000 g/mol, particularly preferable from 10000 to 35000 g/mol and very particularly preferably from 10000 to 30000 g/mol. Polyolefins according to the invention having weight average molar masses of >75000 g/mol are also suitable, in particular, for use in moulding compositions as can be used, for example, for heavy compositions for carpets and/or carpet rear-side coatings. Polymers having a relatively high molecular weight, especially those having weight average molar masses of more than 200000 g/mol, have, particularly in the case of linear polyolefins, a high to very high melt viscosity. This is thoroughly desirable for many applications, e.g. the production of mouldings or the production of films and sheets, because they give the products a high stiffness and a high tensile strength. However, such materials are completely unsuitable for use as raw materials for hot melt adhesives. In particular, they have only slow crystallization (as a result of chain entanglement) and cannot be applied readily and have poor spreading behaviour even in the case of bead application or doctor blade application. This is also to be attributed, inter alia, to the structural viscosity which is increasingly more strongly pronounced with increasing molar mass. In addition, they cannot be processed at all using conventional processing and application machines in the hot melt adhesives sector because of their high melt viscosity; in many cases, they are not pumpable at acceptable temperatures and in addition give a very high pressure buildup in the pipes. On the other hand, polymers having a very low molecular weight do not display satisfactory cohesion even in the cooled state and have a wax-like behaviour. They are thus unsuitable for, in particular, use in the field of hot melt adhesives. Low molecular weight constituents also tend to migrate out by diffusion, which greatly weakens an adhesive bond and leads to its failure. In fields where demanding requirements have to be met in terms of the liberation of organic volatile materials, e.g. in the case of automobile carpets or floor coverings for rooms of dwellings, adhesive systems or heavy compositions which have high proportions of low molecular weight compounds can frequently also not be used for legal or regulatory reasons.

Furthermore, the polyolefins used have an ALPHA VALUE determined by high-temperature gel permeation chromatography with universal calibration in the range from 0.5 to 1.15, preferably in the range from 0.55 to 1.10, particularly preferably in the range from 0.57 to 1.07 and very particularly preferably in the range from 0.58 to 1.05. The polyolefins used thus have a low branching tendency, in particular they preferably do not contain any long-chain branches. Owing to their molecular structure, branched polymers display highly complex rheological behaviour, which leads to difficulties in application from the melt, unsatisfactory penetration into the raw carpet and poor spreading, particularly in the case of doctor blade and spray application.

In a particularly preferred embodiment, the ALPHA VALUE determined by high-temperature gel permeation chromatography with universal calibration is in the range from 0.55 to 0.80, preferably from 0.57 to 0.79 and very particularly preferably from 0.58 to 0.78, while at the same time the polydispersity of the polymers according to the invention, likewise determined by high-temperature gel permeation chromatography with universal calibration, is in the range from 2.0 to 3.5, preferably from 2.1 to 3.4, particularly preferably from 2.2 to 3.3 and very particularly preferably from 2.3 to 3.2.

In a further particularly preferred embodiment, the ALPHA VALUE determined by high-temperature gel permeation chromatography with universal calibration is in the range from 0.7 to 1.1, preferably from 0.75 to 1.08, particularly preferably from 0.8 to 1.06 and very particularly preferably from 0.82 to 1.05, while at the same time the polydispersity of the polymers according to the invention, likewise determined by high-temperature gel permeation chromatography with universal calibration, is not more than 3, preferably not more than 2.5, particularly preferably not more than 2.3 and very particularly preferably not more than 2.0.

The proportion of low molecular weight constituents having a molecular weight of from 500 to 1000 dalton found in the analysis by gel permeation chromatography with universal calibration is preferably not more than 0.75% by mass, more preferably not more than 0.70% by mass, particularly preferably not more than 0.65% by mass, in particular not more than 0.60% by mass. It is very particularly preferred that no constituents havng a molecular weight of from 500 to 1000 dalton can be detected by the method described. This leads to the polyolefins used containing no polymer constituents which tend to migrate to, for example, the surface and/or the interface. Such migration (also referred to as "sweating") leads, as a result of the removal of low molecular weight polymer constituents, to great weakening of an adhesive bond containing this polymer. In addition, materials containing constituents which migrate or are volatile at room temperature must not be used in many fields because of legally binding regulations.

Furthermore, the proportion of low molecular weight constituents having a molecular weight of less than 500 dalton found in the analysis by high-temperature gel permeation chromatography with universal calibration is preferably not more than 0.4% by mass, more preferably not more than 0.35% by mass, particularly preferably not more than 0.3% by mass, in particular not more than 0.25% by mass. Very particular preference is given to no constituents having a molecular weight of less than 500 dalton being able to be detected by the method described. In motor vehicle interiors there is the problem of low molecular weight polymer constituents having very low molar masses migrating out of the adhesive layer and vaporizing, which leads to an undesirable "fogging" phenomenon. Polymers containing low molecular weight constituents having low molar masses are therefore unsuitable for such applications; very strict limits are imposed by the automobile manufacturers. The same applies to the field of floor coverings in rooms in dwellings and business premises.

Furthermore, the polyolefins used have a complex melt viscosity of from 600 to 400000 mPa*s, preferably from 700 to 300000 mPa*s, particularly preferably from 1000 to 200000 mPa*s and very particularly preferably from 1250 to 150000 mPa*s, at a temperature of 190° C., a deformation of not more than 1% and a measurement frequency of 1 Hz. Various ranges are very particularly preferred depending on the desired use. Thus, for example, for use in the field of spray application and/or for nap and filament binding, polyolefins used according to the invention having a melt viscosity of from 600 to 10000 mPa*s, preferably from 600 to 8000 mPa*s, particularly preferably from 600 to 5000 mPa*s and in particular <4000 mPa*s, are particularly preferred, while for use in moulding compositions (e.g. for producing heavy compositions for carpets), polymers having a melt viscosity of >40000 mPa*s, particularly preferably >50000 mPa*s and very particularly preferably >60000 mPa*s, are particularly preferred.

In a particular, preferred embodiment, the polyolefins according to the invention are used in the production of the floor coverings according to the invention both for nap and/or filament binding and for carpet rear-side coating, with the properties of the polyolefins used according to the invention differing as follows.

In the case of nap and/or filament binding, preference is accordingly given to using at least one polyolefin according to the invention which has a weight average molar mass determined by gel permeation chromatography with universal calibration of <40000 g/mol, preferably <30000 g/mol, particularly preferably <25000 g/mol and very particularly preferably <20000 g/mol, while at the same time the polydispersity, likewise determined by gel permeation chromatography with universal calibration, is not more than 2.5, preferably not more than 2.3, particularly preferably not more than 2.1 and very particularly preferably less than 2.0, while at the same time the melt viscosity determined by oscillation rheometry (deformation not more than 1%, measurement frequency=1 Hz) at 190° C. is not more than 10000 mPa*s, preferably not more than 7500 mPa*s, particularly preferably not more than 5000 mPa*s and very particularly preferably less than 4000 mPa*s, while at the same time the proportion of low molecular weight constituents in the range from 1000 to 500 dalton and <500 dalton determined by gel permeation chromatography with universal calibration is in each case not more than 0.2% by mass, preferably in each case not more than 0.15% by mass, particularly preferably in each case not more than 0.1% by mass and very particularly preferably less than, in each case, 0.05% by mass.

In the case of carpet rear-side coating (e.g. in a heavy composition), preference is accordingly given to using at least one polyolefin according to the invention which has a weight average molar mass determined by gel permeation chromatography with universal calibration of >30000 g/mol, preferably >40000 g/mol, particularly preferably >50000 g/mol and very particularly preferably >55000 g/mol, while at the same time the polydispersity, likewise determined by gel permeation chromatography with universal calibration, is not more than 3, preferably not more than 2.8, particularly preferably not more than 2.5 and very particularly preferably less than 2.2, while at the same time the melt viscosity determined by oscillation rheometry (deformation not more than 1%, measurement frequency=1 Hz) at 190° C. is at least 35000 mPa*s, preferably at least 40000 mPa*s, particularly preferably at least 50000 mPa*s and very particularly preferably greater than 60000 mPa*s, while at the same time the proportion of low molecular weight constituents in the range from 1000 to 500 dalton and <500 dalton determined by gel permeation chromatography with universal calibration is in each case not more than 0.2% by mass, preferably in each case not more than 0.15% by mass, particularly preferably in each case not more than 0.1% by mass and very particularly preferably less than, in each case, 0.05% by mass.

As a measure of the pseudoplasticity of the polyolefins used, it is possible to employ the ratio of the melt viscosity measured at 190° C. and a deformation of not more than 1% at a shear rate of 10 Hz and at a shear rate of 0.1 Hz. For the polyolefins used, this ratio is in the range from 1:1 to 1:100, preferably from 1:1.05 to 1:80, particularly preferably from 1:1.075 to 1:60 and particularly preferably from 1:1.1 to 1:40.

The polyolefins used thus have an optimal balance between processability and spreading properties. In particular, it is important for the processability of a polymer melt in the hot melt adhesives field (e.g. during spraying) that the viscosity in the application tool (e.g. spray gun) in which high shear rates usually prevail is low and the material can thus be transported and distributed readily. On the other hand, an increase in the viscosity when shear is no longer present is important for the spreading of the applied polymer melt on the substrate so that no spreading of the polymer melt beyond the sprayed region takes place. However, the increase has to be within narrow limits since otherwise no coagulation of the individual spray particles takes place.

An important parameter for hot melt adhesives or adhesive raw materials is the temperature-dependent rheological behaviour. This can be determined, for example, by measuring a cooling curve in an oscillatory rheometer, with a very low deformation (max. 1%) and a slow cooling rate (1.5 K/min) being employed. The measured values obtainable from the cooling curve are significantly superior to those obtained from heating curves (in particular from curves during first heating) in terms of their reproducibility since the preceding melting firstly levels out the thermal prehistory of the polymer sample and, secondly, optimal wetting of the measurement body surface by the melt occurs, as a result of which frictional and slippage effects between measurement body and sample are ruled out. In addition, the susceptibility to deformation (i.e. the risk of an irreversible change in morphology) of the polymer sample is significantly lower at the high temperatures at the start of the measurement (i.e. in the melt) than in the solid state, so that only in this way can it be ensured that the polymer sample remains within the linear viscoelastic region. Furthermore, it should be noted that the rheological material states during adhesive bonding by means of hot melt adhesives can in any case be realistically modeled only by means of a cooling curve since this is the state present during adhesive bonding.

In addition, the polyolefins used have a minimal processing temperature ("crosspoint", intersection of storage modulus and loss modulus) determined by oscillatory rheometry at a shear rate of 1 Hz of not more than 160° C., preferably not more than 150° C., particularly preferably not more than 145° C. and very particularly preferably not more than 140° C. The polyolefins used accordingly have optimal rheological processing properties in the processing range of 100-220° C. which is relevant for hot melt adhesives. If the loss modulus is higher than the storage modulus, the polymer can be induced to flow and be permanently deformed when shear energy is applied. On the other hand, if the storage modulus is higher, the elastic recover forces are so great that trouble-free application is not possible.

As rheological indication of the optimal processing window, it is possible to employ the ratio of storage modulus and loss modulus in the temperature range from the end of the melting point up to about 220° C. For trouble-free application from the melt, the loss modulus G" (as synonym for the viscous materials properties) has to be significantly above the storage modulus G' (as synonym for the elastic materials properties) in the processing window. The ratio of storage modulus G' to loss modulus G" for the polymers claimed at a shear rate of 1 Hz in the temperature range from the end of the highest melting peak (offset/DSC) to about 220° C. is from 1:1 to 1:10000, preferably from 1:1.25 to 1:5000, particularly preferably from 1:1.5 to 1:2500 and very particularly preferably from 1:2 to 1:1000.

Preference is likewise given to the minimal shear rate determined by oscillatory rheometry at or above which the loss modulus is above the storage modulus (crosspoint) and the melt is thus rheologically processable being not more than 10 Hz, more preferably not more than 5 Hz, particularly preferably not more than 1 Hz and very particularly preferably 0.1 Hz, at the processing temperature. The frequency-dependent measurement of storage modulus G' and loss modulus G" by oscillatory rheometry (sample deformation not more than 1%) at the processing temperature in the frequency range from 0.1 to 10 Hz very particularly preferably does not have an intersection ("crosspoint") of G' and G", with G" being greater than G' over the entire frequency range. This ensures that the polyolefins used can be brought into a fluid state by means of relatively little shear energy at the processing temperature. This is particularly important when the melt is processed by spraying, both within the processing machine (where trouble-free transport of the melt without an excessive pressure buildup is ensured as a result) and on the surface to which the melt is applied (where the adhesive has to spread at low shear stresses).

The needle penetration of the polyolefins used is not more than 35*0.1 mm, preferably 1-30*0.1 mm, particularly preferably 2-25*0.1 mm and very particularly preferably 3-20*0.1 mm, with ranges of 1-8*0.1 mm and 10-20*0.1 mm being very particularly preferred. This ensures that the polyolefins used have a satisfactory degree of plasticity despite high strength. This is particularly important in application areas in which there is a dynamic load on the adhesive bonding. Highly crystalline polyolefins have a needle penetration of <1*0.1 mm and are therefore very hard and not plastically deformable, i.e. not flexible, in the unmolten state. Predominantly amorphous polyolefins have a needle penetration of >60*0.1 mm and therefore do not display satisfactory strength.

The polyolefins used have a predominantly partially crystalline nature, i.e. have a significant proportion of crystalline material. This is shown by the melting peak in the first and second heating of the polymers in the DSC. Regardless of the number and sharpness of the melting peaks, the melting peak maxima for the polyolefins according to the invention measured by means of a differential scanning calorimeter (DSC) in the first heating are in the range from 30 to 145° C. Preference is given to 1-3 melting peaks being able to be detected in the first heating in the measurement in a differential scanning calorimeter (DSC), with in the case of three melting peaks the first melting peak maximum being at temperatures of 30-80° C., the second being at temperatures of 50-95° C. and the third being at temperatures of 70-140° C., preferably at temperatures of 72-130° C. If only two melting peaks occur, the first melting peak maximum is in the range from 75 to 130° C. and the second is in the range from 90 to 140° C., particularly preferably 92-135° C. If only one melting peak occurs, the melting peak maximum is in the range from 90 to 145° C.

Regardless of the number and sharpness of the melting peaks, the melting peak maxima for the polyolefins according to the invention in the second heating in the measurement by means of a differential scanning calorimeter (DSC) are in the range from 70 to 145° C. In the second heating in the differential scanning calorimeter, the polymers prepared according to the invention preferably have 1, 2 or 3 melting peaks, with in the case of three melting peaks, the first melting peak maximum being at temperatures of 70-100° C., preferably between 72 and 95° C., the second at temperatures of 80-105° C., and the third at temperatures of 90-140° C., particularly preferably at temperatures of 95-135° C. In the case of two melting peaks, the first melting peak maximum is in the range from 50 to 125° C. and the second melting peak maximum is at 65-140° C., particularly preferably 70-135° C. If only one melting peak is present, the melting temperature is from 75 to 145° C., particularly preferably 78-142° C. Depending on the copolymer composition, the polymers have a tendency to undergo cold crystallization and the exothermic cold crystallization peak (if present) in the second heating is in the range from 15 to 40° C.

This ensures that the polyolefins used have an optimal ratio of crystalline and noncrystalline units and display optimal thermal properties under load and during processing. Under load, more or less strongly pronounced partial melting, depending on the polymer composition, occurs at elevated temperatures before the adhesive bond melts completely. In this way, plastic deformation is possible without complete release (melting) of the adhesive bond, which is particularly advantageous in the case of structural adhesive bonds and temporary fixing. If this is not desired, the polymers used can also be modified by changing polymer composition and polymerization conditions so that no significant partial melting takes place until just below the melting point. In the latter case, very high heat distortion resistances of the adhesive bond can be achieved, with the heat distortion temperature being very close to the softening temperature.

In contrast to highly crystalline polyolefins which have a single very sharp melting peak, the polyolefins used display either one melting peak, two melting peaks or three melting peaks in the second heating curve in the DSC, which can have different intensities. In the first and in the second heating curve, all polyolefins used display at least one melting peak. The end of the melting range of the second heating curve of the DSC (known as peak offset) is in the case of the polyolefins used in the range from 77° C. to 155° C., preferably from 79° C. to 152° C., particularly preferably from 80° C. to 150° C. and very particularly preferably from 82° C. to 148° C. If the end of the melting range is at low temperatures, this is particularly advantageous for the adhesive bonding of thermolabile materials. On the other hand, if the end of the melting range is high, this results in a particularly high heat distortion resistance.

The polymers preferably have an endothermic enthalpy of fusion measured in the second heating in the DSC of 10 to 85 J/g, preferably 12-80 J/g, particularly preferably 14-78 J/g and very particularly preferably 16-75 J/g, with the ranges of 1-15 J/g, 20-40 J/g and 50-80 J/g being particularly preferred. This ensures that the polyolefins used have a crystallinity which is high enough to ensure a high initial strength of an adhesive bond. Depending on the polymer composition and the polymerization conditions selected, it is possible to provide polymers which require only a moderate or else a relatively high (compared to conventional partially crystalline polyolefins) energy input to melt them.

The exothermic enthalpy of cold crystallization measured in the second heating in the DSC is preferably in the range 0-40 J/g, preferably 10-35 J/g, particularly preferably 15-32 J/g and very particularly preferably 17-30 J/g.

The glass transition temperature of the polyolefins used determined by means of DSC (second heating curve, 20 K/min.) is not more than −5° C., preferably in the range from −10 to −50° C., particularly preferably from −12 to −47° C. and very particularly preferably from −15 to −45° C. This ensures that the polyolefins used can, despite their crystalline isotactic proportions and depending on polymer composition and polymerization conditions selected, also be used in fields of application which demand high low-temperature flexibility and therefore remain closed to highly crystallized polyolefins (e.g. isotactic polypropylene). It is particularly noteworthy that the low glass transition temperatures of the polyolefins used are achieved without the use of expensive comonomers such as 1-pentene, 1-hexene, 1-octene, 1-nonene and/or 1-decene.

Furthermore, the softening point of the polyolefins used measured by the ring & ball method is, depending on the copolymer composition, not more than 148 C, preferably 80-146° C., particularly preferably 85-144° C. and in particular from 90 to 140° C. This ensures that it is possible to provide polymers whose adhesive bonds have an increased heat resistance.

Preference is also given to the softening temperature found (by the ring & ball method) for the polyolefins according to the invention differing, depending on the copolymer composition from the uppermost melting temperature (maximum melting peak) determined in the second melting in the DSC by 1-40 K, preferably 2-35 K, particularly preferably 3-32 K. The softening temperature found (by the ring & ball method) is very particularly preferably 1-40 K above, preferably 3-35 K above, particularly preferably 5-30 K above, the uppermost melting temperature (maximum melting peak) determined in the second melting in the DSC. This ensures that it is possible to provide polymers which still have good cohesion of the material above their melting points, so that high heat distortion resistances can be achieved.

The polyolefins used preferably have a solubility in xylene at room temperature of 2-100% by mass, more preferably 4-100% by mass, particularly preferably 6-100% by mass and very particularly preferably 15-100% by mass, with the insolubility fractions (if they contain propene) having a proportion of isotactic propene triads of at least 75% by mass, preferably at least 80% by mass and particularly preferably at least 82% by mass and at the same time having a proportion of atactic triads of not more than 15% by mass, preferably not more than 12% by mass and particularly preferably not more than 10% by mass, with the proportion of syndiotactic triads being <10% by mass, preferably <8% by mass, particularly preferably <6% by mass and very particularly preferably <5% by mass. This has the advantage that, depending on the copolymer composition and polymerization conditions selected, it is possible to make available polymers which have moderate to very good solubility in xylene and, in contrast to previously known systems having this property, have a very narrow molar mass distribution with extremely low proportions of low molecular weight material, and also high crystallinity relative to the solubility and a high softening point and a moderate needle penetration. In particular, the polyolefins used which have a xylene solubility of 100% by mass at room temperature have an exothermic enthalpy of fusion in the second heating of the DSC of up to 50 J/g, preferably up to 49 J/g, particularly preferably up to 48 J/g and very particularly preferably 1-45 J/g, with the proportion of isotactic propene triads (if propene is present as comonomer) being not more than 99% by mass, preferably not more than 97% by mass and particularly preferably 70-95% by mass, based on the propene triads present, while the proportion of isotactic 1-butene triads (if 1-butene is present as comonomer) is not more than 99% by mass, preferably not more than 97% by mass and particularly preferably in the range from 60 to 95% by mass, based on the 1-butene triads present. At the same time, they have a softening point determined by the ring and ball method of at least 80° C., preferably at least 83° C., particularly preferably at least 85° C. and very particularly preferably 85-130° C. At the same time, they have a needle penetration of not more than 20*0.1 mm, preferably not more than 18*0.1 mm, particularly preferably not more than 16*0.1 mm and very particularly preferably 1-15*0.1 mm. The polyolefins used having a high solubility in xylene make it possible to produce solution formulations which can be handled readily and have a low toxic hazard potential.

In a particular, preferred embodiment, the polyolefins according to the invention have a complex melt viscosity (determined at 190° C. with a deformation of not more than 1% and a measurement frequency of 1 Hz) of not more than 15000 mPa*s, preferably not more than 10000 mPa*s, particularly preferably not more than 7500 mPa*s and very particularly preferably not more than 5500 mPa*s, while at the same time their solubility in xylene at room temperature is at least 70% by mass, preferably at least 75% by mass, particularly preferably at least 80% by mass and very particularly preferably above 90% by mass.

The polyolefins used also preferably have a solubility in tetrahydrofuran at room temperature of up to 100% by mass, preferably 1-100% by mass, particularly preferably 5-100% by mass and very particularly preferably 10-100% by mass. In a particular, preferred embodiment, the polymers according to the invention have a solubility in tetrahydrofuran at room temperature of up to 60% by mass, preferably 1-58% by mass, particularly preferably 2-56% by mass and very particularly preferably 5-55% by mass. This has the advantage that it is possible to make available (e.g. for solvent applications) nonpolar polymers which have a moderate to good solubility in a polar solvent but, in contrast to previously known systems having this property, have a very low molar mass distribution with extremely small proportions of low molecular weight material, and also a high crystallinity relative to the solubility and a high softening point and moderate needle penetration, so that polymers which despite their solubility in tetrahydrofuran have a very good cohesion of the material are provided. The polyolefins used having solubility in tetrahydrofuran also make it possible to produce solution formulations which, owing to the low boiling point of THF, allow very short initial drying/airing times to be achieved.

In a particular, preferred embodiment, especially when the polyolefins according to the invention are used for nap and/or filament binding, at least one of the polyolefins used according to the invention has a complex melt viscosity (determined at 190° C. with a deformation of not more than 1% and a measurement frequency of 1 Hz) of not more than 15000 mPa*s, preferably not more than 10000 mPa*s, particularly preferably not more than 7500 mPa*s and very particularly preferably not more than 5500 mPa*s, while at the same time their solubility in xylene and THF at room temperature is at least 70% by mass, preferably at least 75% by mass, particularly preferably at least 80% by mass and very particularly preferably above 90% by mass.

In addition, the polyolefins used have, without further additions of untreated isotactic polypropylene, an adhesive shear strength after storage for at least 24 hours of at least 0.20 MPa, preferably at least 0.25 MPa, particularly preferably at least 0.35 MPa and in particular 0.4-5 MPa. In the case of untreated polyethylene and without further additions, the adhesive shear strength after storage for at least 24 hours is at least 0.05 MPa, preferably at least 0.1 MPa, particularly preferably at least 0.2 MPa and in particular more than 0.25 MPa. In the case of untreated beech test specimens, the adhesive shear strength without further additions after a storage time of at least 24 hours is at least 1.0 MPa, preferably at least 1.5 MPa, particularly preferably at least 2.0 MPa and very particularly preferably more than 2.5 MPa. In the case of untreated PVC and without further additions, the adhesive shear strength after a storage time of at least 24 hours is more than 0.15 MPa, preferably at least 0.25 MPa, particularly preferably at least 0.3 MPa and very particularly preferably more than 0.32 MPa.

In a very particularly preferred embodiment, the polyolefins according to the invention at the same time have an adhesive shear strength on untreated beech wood and untreated isotactic polypropylene of at least 0.6 MPa, preferably at least 1 MPa, particularly preferably at least 1.5 MPa and very particularly preferably at least 1.75 MPa.

In a further very particularly preferred embodiment, the polyolefins according to the invention have an adhesive shear strength on untreated beech wood of at least 1.0 MPa, preferably at least 1.5 MPa, particularly preferably at least 2 MPa and very particularly preferably at least 2.5 MPa, while at the same time the adhesive shear strength on untreated isotactic polypropylene is at least 1.0 MPa, preferably at least 1.5 MPa, particularly preferably at least 2.0 MPa and very particularly preferably at least 2.5 MPa. The two materials "untreated beech wood" and "isotactic polyolefins" used here are representative of natural materials (beech wood) and nonpolar synthetic polymers (polypropylene) as are used in the production of floor coverings.

The open time of the polyolefins used can be, depending on polymer composition and polymerization conditions used, up to 30 minutes. The open time without further additions is particularly preferably, especially when the polyolefins used are employed in nap and/or filament binding, not more than 300 seconds, preferably not more than 200 seconds, particularly preferably not more than 150 seconds and very particularly preferably not more than 120 seconds, with further preferred ranges being not more than 100 seconds, not more than 60 seconds, not more than 45 seconds, not more than 30 seconds, not more than 20 seconds, and in particular 1-30 seconds.

Furthermore, the polyolefins used have, without further additions, a tensile strength in a tensile test after a storage time of at least 24 hours of 1-25 MPa, preferably 1.2-23 MPa, particularly preferably 1.3-21 MPa and in particular from 1.5 to 20 MPa, and/or an absolute elongation at break of at least 10%, preferably at least 15%, particularly preferably 20-1500% and very particularly preferably 25 to 1250%, with ranges of 50-75%, 100-650% and 150-600%, and also ranges of 150-1200%, 250-1100% and 250 to 1000% likewise being particularly preferred.

In a further very particularly preferred embodiment, the polyolefins according to the invention have a tensile strength of at least 1 MPa, preferably at least 2 MPa and very particularly preferably at least 4.0 MPa, while at the same time the absolute elongation at break is at least 100%, preferably at least 200%, particularly preferably at least 300% and very particularly preferably at least 350%, and at the same time the adhesive shear strength on untreated beech wood and untreated isotactic polypropylene is at least 1 MPa, preferably at least 1.5 MPa, particularly preferably at least 1.75 MPa and very particularly preferably at least 2.0 MPa.

The process for preparing the polyolefins used comprises bringing a metallocene compound, at least one first solvent which is an unhalogenated aliphatic solvent, at least one methylaluminoxane component which is modified by alkyl groups and may be present in solution and/or suspension in a second solvent which is an unhalogenated solvent which can be identical or different to the first solvent and at least one 1-olefin monomer into contact with one another in a reaction space and subsequently polyermizing the at least one 1-olefin monomer at a reaction temperature to form polyolefins according to the invention, wherein the reaction temperature is above the boiling point of the first solvent(s).

The process mentioned has the advantage that such a process makes it possible, in particular, for the solvent used to be separated off completely from the polymer. For the process described in the present invention, this is an essential characteristic since a major part of the solvent can be separated off in this way in the first vaporization stage.

At the same time, the upper temperature limit (softening point of the polymer prepared according to the invention) avoids excessive thermal stress on the polymers produced and ensures a reaction temperature which is optimal for the metallocene catalysts used according to the invention.

It is important for the process that the reaction temperature in the steady state of the reaction is above the boiling point of the first solvent(s) and preferably at the same time below the softening point (determined by the ring and ball method) of the polymer prepared according to the invention. In particular, the polymerization temperature in the steady state of the reaction is at least 10 K below, preferably at least 15 K below, particularly preferably at least 20 K below and very particularly preferably at least 25 K below, the softening temperature. The latter is a particularly outstanding characteristic of the process according to the invention because, despite these temperature conditions, formation of macroscopic polymer particles (as are present, for instance, in a slurry polymerization) in the polymerization medium does not occur but instead polymerization occurs in a homogeneous phase when the process according to the invention is employed.

A further important characteristic of the process is that the polymerization temperature is particularly preferably below the softening point of the prepared polymer.

The at least one first solvent is selected from among unhalogenated cyclic and/or linear aliphatic solvents. The solvent preferably has a boiling point at atmospheric pressure of not more than 101° C. The aliphatic solvents preferably have a boiling point at atmospheric pressure of not more than 80° C., preferably not more than 60° C., particularly preferably not more than 40° C. and very particularly preferably not more than 20° C.

In particular, the unhalogenated aliphatic solvents are cyclic and/or linear aliphatic compounds having not more than 7 carbon atoms, preferably not more than 6 carbon atoms and particularly preferably not more than 5 carbon atoms. The unhalogenated aliphatic solvent is particularly preferably selected from the group consisting of propane, butane, pentane, cyclopentane, methylcyclopentane, hexane, cyclohexane, methylcyclohexane, heptane and mixtures thereof. The solvent is very particularly preferably propane and/or n-butane.

The metallocene compound which is preferably used in the present process is selected from among compounds of the formula I $$Z_xR^1R^{1a}YR^2R^{2a}(IndR^3R^4R^5R^6R^7R^8)_2MCl_2 \qquad I$$

where M is a transition metal selected from the group consisting of Zr, Hf and Ti, preferably Zr, and Ind is indenyl and $Z_xR^1R^{1a}YR^2R^{2a}$ is a bridge connecting the indenyl radicals, where Z and Y are selected from among carbon and silicon, x=0 or 1 and $R^1$, $R^{1a}$ and $R^2$ and $R^{2a}$ are selected independently from among H, linear or branched alkyl groups having from 1 to 6 carbon atoms, alkoxyalkyl groups having from 1 to 6 carbon atoms, aryl groups or alkoxyaryl groups having from 6 to 10 carbon atoms, and $R^3$ to $R^8$ are selected from the group consisting of H and linear or branched alkyl groups having from 1 to 10 carbon atoms, alkylaryl groups, arylalkyl groups or aryl groups having from 6 to 10 carbon atoms.

The radicals $R^3$, $R^5$ and/or $R^7$ are preferably selected from the group consisting of H and linear or branched alkyl groups having from 1 to 10 carbon atoms and aryl groups having from 6 to 10 carbon atoms, in particular linear or branched alkyl groups having from 1 to 10 carbon atoms. If $R^6$ and $R^7$ are both not substituted by H, then $R^6$ and $R^7$ are particularly preferably joined to one another, in particular in the form of a fused benzene ring. Particular preference is given to $R^3$ to $R^8$ being hydrogen, i.e. the indenyl ring is unsubstituted. In a particular embodiment, the indenyl ligands are tetrahydroindenyl ligands.

The metallocene compound is preferably one of the formula II,

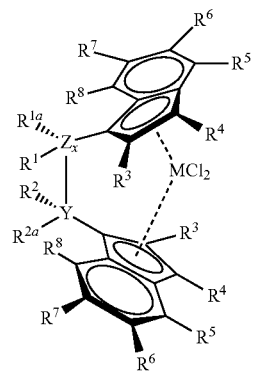

where $R^1$ to $R^8$ are as defined above.

Linear and branched alkyl groups having from 1 to 10 carbon atoms are, in particular, substituents selected from the group consisting of methyl, ethyl, propyl, isopropyl, butyl, tert-butyl, pentyl, hexyl, heptyl, octyl, nonyl and decyl.

Alkoxyalkyl groups having from 1 to 6 carbon atoms are, in particular, selected from the group consisting of methoxymethyl, methoxyethyl, methoxypropyl, ethoxymethyl, ethoxyethyl and ethoxypropyl.

Aryl groups having from 6 to 10 carbon atoms are, in particular, selected from the group consisting of benzyl, phenyl and indenyl.

Alkylaryl groups having from 6 to 10 carbon atoms are, in particular, selected from the group consisting of methylenephenyl, methyleneindenyl and ethylbenzyl.

Arylalkyl groups having from 6 to 10 carbon atoms are, in particular, selected from the group consisting of methylphenyl, dimethylphenyl, ethylphenyl, ethylmethylphenyl and methylindenyl.

Alkoxyaryl groups having from 6 to 10 carbon atoms are, in particular, selected from the group consisting of methoxyphenyl, dimethoxyphenyl, ethoxyphenyl, methoxyethoxyphenyl and methoxyindenyl where the alkoxy group is preferably located in the para position relative to the point of linkage of the alkoxyaryl group to the metallocene.

In particular, $Z_xR^1R^{1a}YR^2R^{2a}$ is selected from the group consisting of —$CH_2$—, —$HCCH_3$—, —$C(CH_3)_2$—, —$CH_2CH_2$—, —$C(CH_3)_2C(CH_3)_2$—, —$CH_2C(CH_3)_2$—, —$Si(CH_3)_2$—, —$Si(CH_3)_2Si(CH_3)_2$—, —$Si(CH_3)_2C(CH_3)_2$—, —$C(CH_3)_2Si(CH_3)_2$—, —$C(C_6H_5)_2$—, —$C(C_6H_4OCH_3)_2$—, —$C(OCH_2C_6H_5)_2$—, —$C(OCH_3)_2$—, —$C(OCH_3)_2C(OCH_3)_2$, and —$CH_2C(OCH_3)_2$—.

The metallocene compound in the present process is very particularly preferably diphenylsilylbis(indenyl)zirconium dichloride, dimethyl-methylenebis(indenyl)zirconium dichloride, dimethylsilylbis(2-methyl-inedenyl)zirconium dichloride, dimethylsilylbis(2-methyl-4,6-diisopropyl-indenyl)zirconium dichloride, dimethylsilylbis(2-methylbenzoindenyl)zirconium dichloride, ethylidenebis(indenyl)zirconium dichloride or ethylidenebis(tetra-hydroindenyl)zirconium dichloride.

The compounds mentioned are preferably present as a racemic mixture of enantiomers and particularly preferably do not contain a significant proportion of the enantiomorphic, optically inactive meso form. The proportion of the meso form in the present invention is not more than 5% by mass, preferably not more than 2% by mass and particularly preferably not more than 1% by mass.

The catalyst is preferably introduced into the polymerization space together with a large excess of aliphatic hydrocarbon(s), particularly preferably the first solvent, and is particularly preferably introduced in homogeneous form, i.e. completely in solution.

The 1-olefin monomers used in the polymerization can in principle be selected from among all 1-olefins known to those skilled in the art. In particular, the at least one 1-olefin monomer is selected from the group consisting of ethylene and linear 1-olefins. Suitable linear 1-olefins are, in particular, propene and/or 1-butene.

In carrying out the reaction of the process, the metallocene compound and the at least one methylaluminoxane component modified by alkyl groups are preferably fed in homogeneous form into the reaction space. This is effected, in particular, by the metallocene compound being present in solution in the first solvent and the at least one methylaluminoxane component modified by alkyl groups being present in solution in the second solvent and the two solutions being fed together into the reaction space, with mixing of the two feed streams preferably taking place only immediately before entry into the reaction space or only in the reaction space itself, particularly preferably only in the reaction space itself. The (metallocene) catalyst feed fed preferably does not contain any aluminium compounds. This has the advantage that no uncontrolled preactivation and/or secondary reaction of metallocene catalyst and cocatalyst, which can lead to poorly reproducible catalyst activities and polymerization results, takes place.

The at least one methylaluminoxane component modified by alkyl groups serves as cocatalyst in the process according to the invention. In particular, the cocatalyst is a compound of the formula III for the linear type

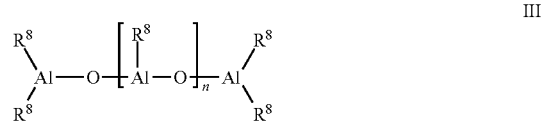

and/or of the formula IV for the cyclic type

where, in the formulae III and IV, $R^8$ is methyl and/or isobutyl and n is an integer from 2 to 50. In particular, from 15 to 45 mol % of the radicals $R^8$ are isobutyl, preferably from 17 to 45 mol %, particularly preferably from 19 to 43 mol % and very particularly preferably from 20 to 40 mol %. Only the proportion of isobutyl radicals makes the cocatalyst soluble in nonaromatic solvents. The cocatalyst is preferably present in solution in a second solvent whose boiling point is very particularly preferably not more than 101° C. The second solvent of the cocatalyst is, in particular, selected from among linear alkanes having 3-7 carbon atoms, preferably 4-6 carbon atoms, with the boiling point of the second solvent preferably being significantly below the polymerization temperature, but this is not absolutely necessary. The second solvent is particularly preferably propane, n-butane, n-pentane, cyclopentane, methylcyclopentane, n-hexane, cyclohexane, methylcyclohexane and/or n-heptane.

The proportion of the second solvent in the total amount of solvent in the polymerization is very small, preferably below 5% by mass, in particular below 2% by mass. Even if the second solvent has a boiling point higher than the polymerization temperature selected, the above-described advantages according to the invention are nevertheless achieved since the proportion of the second solvent is very low and it therefore has essentially no influence on the course of the polymerization.

Overall, the use of aromatic and/or halogenated, in particular chlorinated, solvents is avoided over the entire course of the process according to the invention and only unhalogenated, aliphatic solvents are used. Preference is given to using no hydrocarbon compound having more than 7 carbon atoms as solvent, suspension medium and/or monomer during the entire polymerization process.

The reaction space for carrying out the process can be a stirred vessel, a cascade of stirred vessels having at least two stirred vessels, a flow tube and/or a flow tube with forced transport (e.g. a screw apparatus). The abovementioned reactors can be used either as single items or in any combination.

Furthermore, preference is given to using no separation agents such as oils and/or waxes in the process, either before or during the polymerization and/or the removal of solvent/monomer. This has the advantage that the polymer according to the invention does not contain any separation agents which influence the adhesive properties in an undesirable way and lead to poor performance in the end product. The removal of the separation agents at greatly elevated temperatures (risk of product discoloration) and/or very low pressures (complicated/expensive technology) or purification of the polymers by reprecipitation and/or extraction (complicated/expensive technology) which would otherwise be necessary can be dispensed with.

The polymers prepared in this way can be chemically stabilized according to the prior art either in the form of their reaction solution or at a later point in time in order to protect them against the effects of sunlight, atmospheric moisture and oxygen. Here, it is possible to use, for example, stabilizers containing hindered amines (HALS), hindered phenols, phosphites and/or aromatic amines. The active amount of stabilizers is in the range from 0.1 to 3% by weight, based on the polymer.

In particular cases, it is possible to use antifogging substances as additives. It is here possible to use, for example, fatty acid esters; the active concentrations generally are in the range from 0.1 to 2% by weight, based on the polymer. The polymer obtained according to the invention is obtained after the polymerization either by precipitation in a differently polar precipitate (for instance water and/or alcohols such as ethanol, isopropanol or butanol) or by direct devolatilization with a subsequent melting step. In both cases, it is possible to use either stirred vessels or cascades of stirred vessels or else flow tubes or tubular reactors with forced transport (for example a screw apparatus). In the latter case, the use of multiscrew apparatuses is particularly preferred.

Subsequent to devolatilization, the polymer produced can be subjected to further finishing treatment which can be addition of additives and/or pulverization and/or pelletization and/or granulation. Direct dispensing of the molten polymer into heated transport containers is likewise possible.

Granulation can be strand granulation or underwater granulation, in particular underwater strand granulation or underwater die-face granulation. The use of a surfactant and/or dispersant or a separation agent emulsion may be necessary. The use of liquified or low-temperature gases such as $CO_2$ and/or $N_2$ as coolant is also possible. Pulverization can be carried out either by a separate milling step or by use of a spray method. In both cases, the use of supercritical fluids such as $CO_2$, water or propane is also possible. In these processes, which are known, for example, under the name PGSS ("particle from gas saturated solutions"), the polymer melt is mixed with a supercritical medium and subsequently atomized in a spray tower. Here, the particle sizes can be controlled via the nozzle and tower geometry. The milling process can also be carried out using low-temperature gases such as $CO_2$ and/or $N_2$.

To ensure flowability of the granulated material and/or powder, the flow improvers usually used in the polymer sector can be used. These can be either inorganic or organic in nature and contain either low molecular weight components or high molecular weight components. In both cases, both crystalline and amorphous flow improvers can be used. The flow improvers can be compatible or incompatible in terms of themodynamic miscibility with the polymers prepared according to the invention. Particular preference is given to flow improvers which are compatible with the polymers prepared according to the invention and do not impair the adhesive properties of the polymers because of their chemical nature and/or their low proportion based on the mass of the polymer according to the invention. As flow improvers, it is possible to use, for example, polyolefin waxes (both polyethylene-based waxes and polypropylene-based waxes) and also Fischer-Tropsch waxes. Polyolefin waxes based on 1-butene can also be used. It is likewise possible to use microwaxes. Apart from waxes, it is also possible to use olefin polymers such as polyethylene, polypropylene and/or poly(1-butene), in particular isotactic or syndiotactic polypropylene. Both waxes and polymers can also be used in modified form (e.g. modified by means of maleic anhydride). The use of crosslinked polymers such as crosslinked polyolefins or crosslinked styrene-divinylbenzene polymers in the polymerized state is also possible. Possible inorganic materials are, for example, MgO, talc, silica, etc.

The polyolefins used are preferably employed as or in adhesives or coating compositions for production of the floor coverings according to the invention, particularly preferably in adhesive and coating formulations. The adhesive and coating formulations preferred according to the invention comprise essentially the polymer according to the invention.

Apart from the polyolefins used, further constituents can be present in the adhesive formulations according to the invention. The further constituents can be, particularly in the case of solution formulations, cyclic and/or linear aliphatic and/or aromatic hydrocarbons and also corresponding halogenated hydrocarbons. Here, the good solubility of the polyolefins used in various solvents such as xylene and tetrahydrofuran proves to be particularly advantageous. It is therefore not necessary to choose halogenated solvents in order to be able to produce a solution formulation. Preference is therefore given to using no halogenated hydrocarbons. In the adhesive formulations which are liquid at room temperature, the hydrocarbons mentioned are present in a proportion based on the formulation of not more than 90% by mass, preferably not more than 80% by mass, particularly preferably not more than 75% by mass and very particularly preferably not more than 50% by mass.

The adhesive formulation is very particularly preferably a hot melt adhesive formulation. The coating compositions are very particularly preferably heavy coating compositions which are applied from the melt.

The hot melt adhesive formulation or coating formulation can contain further constituents which are necessary to achieve specific properties such as deformability, adhesive capability, processability, (melt or solution) viscosity, strength, crystallization rate, tack, storage stability, etc. In a particular embodiment of the present invention, the proportion of further constituents is particularly preferably not more than 10% by mass. This has the advantage that the materials properties of the adhesive formulation are essentially those of the polymer according to the invention which is used. Such an adhesive or coating formulation can be produced with very little outlay.

In a further, alternative embodiment of the present invention, the proportion of further constituents can be >10% by mass. In this case, the further constituents make up not more than 80% by mass of the total formulation, preferably not more than 60% by mass, particularly preferably not more than 50% by mass, very particularly preferably not more than 40% by mass.

The further constituents can be inorganic and/or organic fillers which may be, as desired, electrically conductive or insulating, inorganic and/or organic pigments which may be, as desired, electrically conductive or insulating, synthetic and/or natural resins, in particular adhesive resins, synthetic and/or natural oils, inorganic and/or organic, synthetic and/or natural polymers which may be, as desired, electrically conductive or insulating, inorganic and/or organic, synthetic and/or natural fibres which may be, as desired, electrically conductive or insulating, inorganic and/or organic stabilizers, inorganic and/or organic flame retardants.

In particular, the further constituents encompass resins which are used to match particular properties of the adhesive layer, in particular the tack and/or adhesion, the flow and creep behaviour of the adhesive layer and/or the viscosity of the adhesive to particular applications. The resins can be natural resins and/or synthetic resins. In the case of natural resins, these natural resins contain abietic acid as main constituent (e.g. rosin). The resins can also be terpene or polyterpene resins, petroleum resins and/or coumarone-indene resins, in particular $C_5$ resins and/or $C_9$ resins and/or copolymers of $C_5/C_9$ resins. The proportion of the resins in the hot melt adhesive formulation according to the invention is, in particular, not more than 45% by mass, preferably from 1 to 40% by mass, particularly preferably from 2 to 30% by mass and very particularly preferably from 3 to 20% by mass, based on the total formulation.

Furthermore, classical amorphous poly(α-olefins) (known as APAOs) can be present as further constituents in the hot melt adhesive formulations of the invention. The amorphous poly(α-olefins) mentioned can be homopolymers, copolymers and/or terpolymers of ethylene, propylene, 1-butene and linear and/or branched 1-olefins having 5-20 carbon atoms which can be obtained, for example, by classical Ziegler-Natta catalysis or metallocene catalysis. The proportion of amorphous poly(α-olefins) is, in particular, not more than 50% by mass, preferably not more than 40% by mass and particularly preferably not more than 30% by mass, based on the total formulation. The further constituents are preferably crystalline or partially crystalline polyolefins, in particular isotactic polypropylene, syndiotactic polypropylene, polyethylene (HDPE, LDPE and/or LLDPE), isotactic poly(1-butene), syndiotactic poly(1-butene), their copolymers and/or their copolymers with linear and/or branched 1-olefins having from 5 to 10 carbon atoms. Preference is also given to the crystalline or partially crystalline polyolefins being chemically modified polyolefins, with the chemical modification being, in particular, modification by maleic anhydride, itaconic anhydride, acrylic acid, acrylates, methacrylates, unsaturated epoxy compounds, silanacrylates, silanes and hydroxyalkylsilanes.

Furthermore, the further constituents can comprise polymers having polar groups. Polymers having polar groups include polystyrene copolymers (e.g. with maleic anhydride, acrylonitrile, etc.), polyacrylates, polymethacrylates, (co)polyesters, polyurethanes, (co)polyamides, polyether ketones, polyacrylic acid, polycarbonates and chemically modified polyolefins (e.g. poly(propylene-graft-maleic anhydride) or poly(propylene-graft-alkoxyvinylsilane).

Furthermore, the further constituents can comprise homopolymers and/or copolymers based on ethylene, propylene, acrylonitrile, butadiene, styrene and/or isoprene, in particular block copolymers, especially rubbers such as natural and synthetic rubber, poly(butadiene), poly(isoprene), styrene-butadiene rubber and nitrile rubber. The proportion of polymers based on butadiene, styrene and/or isoprene is not more than 20% by mass, preferably 1-15% by mass, particularly preferably 1.5-10% by mass and in particular 2-9% by mass, based on the hot melt adhesive formulations.

Furthermore, the further constituents can comprise elastomeric polymers based on ethylene, propylene, a diene and/or cis,cis-1,5-cyclooctadiene, exo-dicyclopentadiene, endo-dicyclopentadiene and 1,4-hexadiene and 5-ethylidene-2-norbornene, in particular ethylene-propylene rubber, EPM (double-bond-free, ethylene content=40-75% by mass) and/or EPDM. The proportion of polymers based on ethylene, propylene, a diene and/or cis,cis-1,5-cyclooctadiene, exo-dicyclopentadiene, endo-dicyclopentadiene, 1,4-hexadiene and 5-ethylidene-2-norbornene is usually not more than 20% by mass, preferably 1-15% by mass, particularly preferably 1.5-10% by mass and in particular 2-9% by mass, based on the hot melt adhesive formulations.

As an alternative, the further constituents can comprise waxes, in particular modified and unmodified waxes, preferably crystalline, partially crystalline and/or amorphous polyolefin waxes based on polyethylene, polypropylene and/or poly(1-butene), paraffin waxes, metallocene waxes, microwaxes, polyamide waxes, polytetrafluoroethylene waxes and/or Fischer-Tropsch waxes. The proportion of waxes is not more than 50% by mass, preferably 1-40% by mass, particularly preferably 2-30% by mass and very particularly preferably 3-20% by mass, based on the hot melt adhesive formulations.

Furthermore, the further constituents can comprise fillers which are used to match specific property profiles of the layer of adhesive, e.g. the temperature range in which it can be used, the strength, the shrinkage, the electrical conductivity, the magnetism and/or the thermal conductivity, to specific applications in a targeted manner. In particular, use is made of fillers in the production of heavy coatings for carpets. In general, the fillers are inorganic and/or organic fillers. The inorganic fillers are, in particular, selected from among silicas (including hydrophobicized silicas), quartz flour, chalks, barite, glass particles (in particular spherical particles for increasing the reflection of light), glass fibres, carbon fibres, asbestos particles, asbestos fibres and/or metal powders. Organic fillers are, for example, carbon black, bitumen, crosslinked polyethylene, crosslinked caoutchouc or rubber mixtures, synthetic fibres such as polyethylene fibres, polypropylene fibres, polyester fibres, polyamide fibres, aramid fibres, Saran fibres, MP fibres or natural fibres such as straw, wool, cotton, silk, flax, hemp, juice and/or sisal. The proportion of fillers is not more than 80% by mass, preferably 1-60% by mass, particularly preferably 5-40% by mass and very particularly preferably 7-30% by mass, based on the hot melt adhesive formulations.

The further constituents can likewise comprise stabilizers which are used to protect the adhesive formulation against external influences such as the effect of (processing) heat, shear stress, sunlight, atmospheric moisture and oxygen. Suitable stabilizers are, for example, hindered amines (HALSs), hindered phenols, phosphites and/or aromatic amines. In the formulations mentioned, the proportion of stabilizers is not more than 3% by mass, preferably from 0.05 to 2.5% by mass and very particularly preferably from 0.1 to 2% by mass, based on the hot melt adhesive formulations.

In addition, the further constituents can comprise one or more oils which can be natural and/or synthetic oils. These one or more oils preferably have a viscosity at the processing temperature of from 1 to 1000 mPa*s, preferably 2-750 mPa*s, most preferably 3-500 mPa*s. Suitable oils are, for example, mineral oils, (medical) white oils, isobutene oils, butadiene oils, hydrogenated butadiene oils and/or paraffin oils. The proportion of the one or more oils is not more than 50% by mass, preferably 1-45% by mass, particularly preferably 3-40% by mass and in particular 5-38% by mass, based on the hot melt adhesive formulations.

Furthermore, inorganic and/or organic pigments, UV active substances, organic and/or inorganic nucleating agents which accelerate the crystallization of the polymers and thus reduce the open time of the adhesive bond can be present in the hot melt adhesive formulations.

In a further preferred embodiment of the hot melt adhesive formulations of the invention, the above-described formulations are multiphase blends.

The abovementioned hot melt adhesive formulations are used particularly for the production of floor coverings, with the formulations being used for nap and filament binding and/or for rear-side coating.

In the case of nap and filament binding, it is usual to use fibres or fibre composites based on natural and/or synthetic fibres. Examples of natural fibres or fibre composites are wool, cotton, sisal, jute, straw, hemp, flax, silk and/or mixtures of these fibres.

Examples of synthetic fibres or fibre composites to be bound in are (co)polyamide fibres, polyethylene fibres, co(polyester) fibres, polypropylene fibres and/or mixtures of these fibres. In the case of artificial lawn bonding, the filaments bound in by the adhesive bond are selected from among polypropylene filaments, polyethylene filaments, polyamide filaments, polyester filaments or mixed filaments of the polymers listed.

In the abovementioned applications for nap and filament binding, the lower limit to the melt viscosity of the polyolefin(s) according to the invention present is 190° C. Preference is given to at least one of the polyolefins according to the invention present having a melt viscosity at 190° C. of not more than 10000 mPa*s, preferably from 500 to 8000 mPa*s, particularly preferably from 600 to 6000 mPa*s and very particularly preferably from 750 to 4000 mPa*s. In the case of the formulations or coating compositions containing at least one polyolefin according to the invention which are used for nap and/or filament binding, the melt viscosity at 190° C. is in the range from 200 to 8500 mPa*s, preferably from 300 to 6500 mPa*s, particularly preferably from 400 to 5000 mPa*s and very particularly preferably from 500 to 4000 mPa*s. The proportion of polyolefins according to the invention is, in particular, 60-98% by mass. The application weight is, in particular, 20-1500 g/m$^2$, preferably from 50 to 1250 g/m$^2$, particularly preferably from 75 to 1000 g/m$^2$ and very particularly preferably from 80 to 500 g/m$^2$. In a particular embodiment, especially when polyolefins having a melt viscosity at 190° C. of <6000 mPa*s are used, the application weight is less than 750 g/m$^2$, preferably less than 650 g/m$^2$, particularly preferably less than 500 g/m$^2$ and very particularly preferably less than 450 g/m$^2$.

The hot melt adhesive or the coating composition is preferably applied to the rear side of the raw carpet (e.g. needle felt, tufting, velour, loop wear, etc.), with the hot melt adhesive or coating composition preferably being present in molten form. As methods of application, it is possible to use all methods known to those skilled in the art, in particular multiroller application, doctor blade application, spray application, roller application and application by means of a slit nozzle (e.g. in combination with an additional doctor blade and/or an embossing roller). In a particular embodiment, application takes place using a melt extruder in combination with a slit nozzle. In a further particular embodiment, further coatings are applied simultaneously or in succession by coextrusion. In particular, the use of roller application methods makes it possible to achieve particularly low application weights. The application temperature depends firstly on the thermal stability of the raw carpet used (in particular the thermal stability of the carpet colorant or further additives used), and secondly on the thermal (e.g. melting point) and rheological (e.g. melt viscosity) properties of the polyolefin according to the invention which is used. The application temperature in the case of hot melt adhesives or coating compositions which are solid at room temperature is preferably above the softening temperature of the hot melt adhesives or coating compositions used, particularly preferably in the range from 80 to 250° C., very particularly preferably in the range from 95 to 200° C. In a particular embodiment, in particular when the raw carpet contains polyolefin fibres such as polypropylene fibres and/or natural fibres, the application temperature is in the range from 100 to 200° C., preferably from 105 to 195° C., particularly preferably from 110 to 190° C. and very particularly preferably from 115 to 185° C. In a further particular embodiment, especially when the raw carpet contains polyamide fibres, in particular fibres composed of polyamide-6,6, it is also possible to use significantly higher application temperatures. For example, the application temperature in this case is >150° C., preferably >160° C., particularly preferably in the range from 165 to 295° C. and very particularly preferably from 170 to 275° C. Before application of the coating composition, the raw carpet or the floor covering can be preheated, preferably using infrared radiation as heat source. The preceding heating of the raw carpet or the floor covering is particularly advantageous when particularly complete or deep penetration of the hot melt adhesive used or the coating composition used is desired. In a particular embodiment, heated rollers and/or rolls are used for preheating of the raw carpet, resulting in particularly intimate contact and particularly good heat transfer.

The coating weight (amount of hot melt adhesive or coating composition per unit area) required is dependent, in particular, on the type and form of the raw carpet used or the floor covering used. In particular, it is dependent on the thickness of the nap, with thick nap generally requiring a thicker application (i.e. a higher coating weight). It is also dependent on the nap density, with the coating weight generally increasing with increasing number of nap threads per unit area.

After application of the coating composition, the carpet or the floor covering can be subjected to a subsequent heat treatment which prolongs the flowability of the hot melt adhesive used or the coating composition used and thus allows particularly complete or deep penetration of the hot melt adhesive used or the coating composition used. Preference is given to using infrared radiation as heat source for the subsequent heat treatment, but the use of other heat sources such as hot air or steam and/or other heat sources is likewise possible. In a particular embodiment, heated rollers and/or rolls are used for the subsequent heat treatment of the carpet or floor covering, resulting in particularly intimate contact and particularly good heat transfer. In particular, the additional pressure gives particularly good penetration and distribution of the hot melt adhesive used or the coating composition used and thus allows particularly low application weights. In a further particular embodiment, the rolls or rollers used for the preheating and/or the application of the hot melt adhesive or the coating composition and/or the subsequent heat treatment have different temperatures, as a result of which precise control of the penetration and/or coating process is achieved.

As an alternative or in addition, the polyolefins are used, particularly in the form of adhesives, for rear-side coating.

In a particularly preferred embodiment of the present invention, pile threads and/or pile loops are bound in and a textile substrate and/or a nonwoven and/or a felt and/or a foam are laminated on simultaneously or immediately after one another in one working step. The laminated-on textile substrate or the nonwoven or the felt can consist of one or more different materials, in particular natural and/or synthetic inorganic and/or organic materials such as wool, cotton, sisal, jute, straw, hemp, flax, silk, (co)polyamide, polyethylene, co(polyester), polypropylene and/or mixtures of these materials. As an alternative thereto or in addition, a heavy coating composition can also be applied using the same application system. In a particularly preferred embodiment, the hot melt adhesive used or the coating composition used is selected so that rapid solidification occurs after application, so that the carpet can be rolled up immediately after production. In a further particularly preferred embodiment, the nap and/or filament binding of the raw carpet is effected using at least one polymer according to the invention, with the semifinished carpet which has been fixed in this way being rolled up immediately after fixing. In a separate working step, a heavy coating composition which preferably likewise contains at least one polyolefin according to the invention is subsequently applied and the heavy-coated carpet is subsequently shaped, e.g. by stamping.

The present invention further provides floor coverings containing polyolefins, wherein the polyolefins contain not more than 20% by mass of ethylene, either 70-100% by mass or not more than 20% by mass of propylene and/or either 70-100% by mass or not more than 20% by mass of 1-butene, with the sum of the proportions being 100% by mass, and the triad distribution for propene triads determined by $^{13}$C-NMR has an isotactic proportion of 75-98% by mass, an atactic proportion of less than 20% by mass and a syndiotactic proportion of not more than 20% by mass and/or the triad distribution for 1-butene triads determined by $^{13}$C-NMR has an isotactic proportion of 10-98% by mass, an atactic proportion of 1-85% by mass and a syndiotactic proportion of not more than 20% by mass.

In particular, the floor coverings are carpets or artificial lawns.

The carpet elements are, for example, meter ware, carpet nonwovens or a subsequently shaped automobile carpet.

Even without further information, it is assumed that a person skilled in the art can utilize the above description in its widest scope. The preferred embodiments and examples are therefore to be interpreted merely as descriptive, but not in any way limiting disclosure.

The present invention is illustrated below with the aid of examples. Alternative embodiments of the present invention can be obtained in an analogous manner.

EXAMPLES

Analysis:

a) High-temperature $^{13}$C-NMR

The polymer composition is determined by high-temperature $^{13}$C-NMR. $^{13}$C-NMR spectroscopy of polymers is described, for example, in the following publications:

[1] S. Berger, S. Braun, H.-O. Kalinowski, $^{13}$C-NMR-Spektroskopie, Georg Thieme Verlag Stuttgart 1985
[2] A. E. Tonelli, NMR Spectroscopy and Polymer Microstructure, Verlag Chemie Weinheim 1989
[3] J. L. Koenig, Spectroscopy of Polymers, ACS Professional Reference Books, Washington 1992
[4] J. C. Randall, Polymer Sequence Determination, Academic Press, New York 1977
[5] A. Zambelli et al: Macomolecules, 8, 687 (1975)
[6] A. Filho, G. Galland: J. Appl. Polym. Sci., 80, 1880 (2001)

b) High-Temperature GPC

The molecular weight is determined by high-temperature GPC. The determination is carried out as described in ASTM D6474-99 but at a higher temperature (160° C. instead of 140° C.) and using a lower injection volume of 150 μl instead of 300 μl. As further references on the subject of GPC analysis of polymers, mention may be made of:

H. G. Elias: "Makromoleküle"; vol. 2; Wiley-VCH; Weinheim 2001;
Z. Grubisic, P. Rempp, H. Benoit; Polym. Lett.; 5; 753 (1967);
K. A. Boni, F. A. Sliemers, P. B. Stickney; J. Polym. Sci.; A2; 6; 1579 (1968);
D. Goedhart, A. Opschoor; J. Polym. Sci.; A2; 8; 1227 (1970);
A. Rudin, H. L. W. Hoegy; J. Polym. Sci.; A1; 10; 217 (1972);
G. Samay, M. Kubin, J. Podesva; Angew. Makromol. Chem.; 72; 185 (1978);
B. Ivan, Z. Laszlo-Hedvig, T. Kelen, F. Tüdos; Polym. Bull.; 8; 311 (1982);
K.-Q. Wang, S.-Y. Zhang, J. Xu, Y. Li, H. P. Li; J. Liqu. Chrom.; 5; 1899 (1982);
T. G. Scholte, H. M. Schoffeleers, A. M. G. Brands; J. Appl. Polym. Sci.; 29; 3763 (1984).

Trichlorobenzene is used as solvent. The measurement is carried out at a column temperature of 160° C. The universal calibration used for evaluating the elution curves is carried out using polyolefin standards. The results are not comparable with measurements whose calibrations have been carried out using different types of polymers, e.g. polystyrene, or which have been made without universal calibration, since otherwise an impermissible comparison of different three-dimensional polymer structures or hydrodynamic radii would occur. Comparison with measurements using solvents other than the solvent indicated is also not permissible since different three-dimensional polymer structures or hydrodynamic radii can be present in different solvents and would lead to a different result in the molecular weight determination.

The polydispersity $P_d$ is the ratio of number average molar mass to weight average molar mass. It is, in particular, a measure of the width of the molar mass distribution present, which in turn allows conclusions regarding the polymerization behaviour to be drawn. It is determined by high-temperature GPC. The polydispersity is, within certain limits, characteristic of a particular catalyst/cocatalyst combination. The polydispersity has a relatively strong influence on the tack of the material at room temperature and also on the adhesion.

In the determination of the molar masses by means of gel permeation chromatography (GPC), the hydrodynamic radius of the polymer chains present in solution plays a particular role. As detection mechanisms, use is made of thermal conductivity detectors, RI (refractive index) or UV/VIS and FTIR or light-scattering detectors and also viscosity detectors. If the polymer chain is regarded as an undisturbed tangled ball, the relationship between the limiting viscosity number and the molar mass can be described empirically by the KMHS equation $$[\eta]=K_V M_V^\alpha$$

(H.-G. Elias, Makromoleküle, volume 2, 6th edition, Wiley-VCH, Weinheim 2001, pp. 411-413). $K_V$ and $\alpha$ are constants which are influenced both by the constitution, configuration and molar mass of the polymer and by the solvent and the temperature. For the purposes of the present invention, the importance of the alpha value is that it indicates the hydrodynamic radius which depends more or less on the branching points present on the polymer chains. At a low degree of branching, the alpha value is high, while at a higher degree of branching it is low.

c) Rheology

The rheological measurements are carried out in accordance with ASTM D 4440-01 ("Standard Test Method for Plastics: Dynamic Mechanical Properties Melt Rheology") using an MCR 501 rheometer from Anton Paar having a plate-plate geometry (plate diameter: 50 mm) as oscillatory measurement. The maximum sample deformation used in all measurements is 1%, and the temperature-dependent measurements are carried out at a measurement frequency of 1 Hz and a cooling rate of 1.5 K/min.

The melt viscosity is determined by oscillatory rheometry at a shear rate of 1 Hz. The maximum deformation of the sample is selected so that the sample is in the linear viscoelastic range during the entire measurement time.

Viscoelastic materials differ from solids obeying Hooke's law in that they are capable of dissipating stresses resulting from deformation over a particular time (relaxation). In contrast to Newtonian liquids, which undergo exclusively irreversible deformation under the action of shear stress/strain, viscoelastic fluids can recover part of the deformation energy after the shear force has been removed (known as the "memory effect") [N. P. Cheremisinoff; "*An Introduction to Polymer Rheology and Processing*"; CRC Press; London; 1993]. A further characteristic of polymer melts is the occurrence of pseudoplasticity. This is behaviour in which the shear stress as applied force degrades the initial structure of the material as a function of the shear rate. Since a minimum shear rate is required for this degradation process, the material flows like a Newtonian liquid below this shear rate. An explanation is given by Le Chatelier's principle, with the pseudoplastic liquid "getting out of the way" (of the mechanical stress) in the direction along the shear surfaces serving to reduce the frictional resistance. The latter leads to degradation of the equlibrium structure of the initial state and to the formation of a shear-oriented structure, which in turn results in easier flow (reduction of viscosity). In polymer melts, the Newtonian region is discernible only at very small shear rates or small shear amplitudes. Its determination can be carried out by rheometric test methods (amplitude sweeps, i.e. measurement at a fixed frequency as a function of the shear amplitude) and is necessary when the measurement is to be carried out in the reversible, i.e. reproducible, range [R. S. Lenk; "*Rheologie der Kunststoffe*"; C. Hanser Verlag; Munich; 1971; J. Meissner; "*Rheologisches Verhalten von Kunststoff-Schmelzen und -Lösungen*" in: "*Praktische Rheologie der Kunststoffe*"; VDI-Verlag; Düsseldorf; 1978; J.-F. Jansson; *Proc. 8th. Int. Congr. Rheol.*; 1980; Vol. 3]. Vibrational rheometry is particularly well suited to the examination of materials which display pseudoplastic behaviour because of its low applied force, its low deformation and thus its small effect on the morphology of the sample.

d) Needle Penetration

The needle penetration is determined in accordance with DIN EN 1426.

e) DSC

The determination of the enthalpy of fusion, the glass transition temperature and the melting range of the crystalline proportion is carried out by means of differential scanning calorimetry (DSC) in accordance with DIN 53 765 from the second heating curve at a heating rate of 10 K/min. The point of inflection of the heat flow curve is taken as the glass transition temperature.

f) Xylene Solubility

A xylene isomer mixture is used, and the polymer is dissolved under reflux and the solution is then cooled to room temperature.

2 g of polyolefin are dissolved in 250 mL of xylene with stirring and heating to the boiling point of xylene. After the mixture has been refluxed for 20 minutes, the polymer solution is allowed to cool to 25° C. Undissolved or precipitated polyolefin is filtered off with suction (15 cm suction filter, Sartorius 390 filter paper) and dried. The remaining polymer solution is precipitated in a five-fold excess of methanol (admixed with one drop of 37% strength aqueous HCl). The precipitate formed is filtered off with suction and dried at 80° C. in a drying oven (vacuum).

g) Solubility in THF

Solubility in THF is a characteristic of partially crystalline polyolefins. The determination is carried out by a method analogous to the dissolution experiments in xylene.

h) Tensile Strength and Elongation at Break

The determination of the tensile strength and elongation at break is carried out in accordance with DIN EN ISO 527-3.

i) Softening Point (Ring & Ball)

The determination of the softening point by the ring and ball method is carried out in accordance with DIN EN 1427.

j) Adhesive Shear Strength

The determination of the adhesive shear strength is carried out in accordance with DIN EN 1465.

Use of Metallocene Polyolefins Having Isotactic Structural Elements in Floor Coverings:

Examples

1. Polymers According to the Invention a) Microstructure

The polymer composition and the microstructure of the polymers prepared are determined by high-temperature $^{13}$C-NMR.

|  | Polymer | | | | | | | |
|---|---|---|---|---|---|---|---|---|
|  | 1 | 2 | 3 | 4 | 5 | 6 | 7 | 8 |
| Polymer composition | | | | | | | | |
| Ethylene [% by mass] | 5 | 6 | 0 | 9 | 0 | 0 | 2 | 0 |
| Propylene [% by mass] | 92 | 83 | 20 | 82 | 83 | 100 | 0 | 90 |
| 1-Butene [% by mass] | 3 | 11 | 80 | 9 | 17 | 0 | 98 | 10 |
| Propylene triads | | | | | | | | |
| Isotactic [% by mass] | 82 | 86 | 98 | 75 | 94 | 82 | — | 84 |
| Syndiotactic [% by mass] | 4 | 4 | 0 | 6 | 2 | 7 | — | 6 |
| Atactic [1% by mass] | 15 | 10 | 1 | 19 | 4 | 11 | — | 11 |
| 1-Butene triads | | | | | | | | |
| Isotactic [% by mass] | 20 | 42 | 95 | 28 | 94 | — | 80 | 94 |
| Atactic [% by mass] | 80 | 49 | 3 | 63 | 6 | — | 16 | 4 |
| Ethylene triads [% by mass] | 1.2 | 2.0 | 0 | 0.7 | 0 | — | 0 | — |

|  | Polymer | | | | | | |
|---|---|---|---|---|---|---|---|
|  | 9 | 10 | 11 | 12 | 13 | 14 | 15 |
| Polymer composition | | | | | | | |
| Ethylene [% by mass] | 0 | 0 | 0 | 4 | 8 | 6 | 8.5 |
| Propylene [% by mass] | 0 | 85.5 | 6 | 96 | 85 | 88 | 80 |
| 1-Butene [% by mass] | 100 | 14.5 | 94 | 0 | 7 | 6 | 11.5 |
| Propylene triads | | | | | | | |
| Isotactic [% by mass] | — | 86 | 99 | 75 | 76 | 79 | 75 |
| Syndiotactic [% by mass] | — | 4 | — | 6 | 6 | 6 | 6 |
| Atactic [% by mass] | — | 10 | 1 | 19 | 18 | 16 | 19 |
| 1-Butene triads | | | | | | | |
| Isotactic [% by mass] | 94 | 90 | 98 | — | 26 | 22 | 34 |
| Atactic [% by mass] | 5 | 10 | 1 | — | 70 | 70 | 57 |
| Ethylene triads [% by mass] | — | — | — | 0 | 1.3 | 0.8 | 1.9 | b) Molar Masses, Molar Mass Distribution and Polymer Branching

The determination of the molecular weight is carried out by high-temperature GPC. The determination is carried out as described in ASTM D6474-99 but at a higher temperature (160° C. instead of 140° C.) and using a smaller injection volume of 150 µl instead of 300 µl. Examples of molar mass distributions according to the invention and not according to the invention with and without a low molecular weight fraction are shown in the drawings.

|  | Polymer | | | | |
|---|---|---|---|---|---|
|  | 1 | 2 | 3 | 4 | 5 |
| Modality MMV | bimodal | bimodal | bimodal | monomodal | monomodal |
| $M_w$ [g/mol] | 33200 | 27600 | 56000 | 83000 | 76700 |
| Pd [—] | 2.1 | 2.8 | 2.4 | 1.5 | 1.5 |
| α value [—] | 0.67 | 0.58 | 0.76 | 1.04 | 1.01 |
| Constituents 1000-500 D | 0 | 0.5 | 0 | 0 | 0 |
| Constituents < 500 D | 0 | 0 | 0 | 0 | 0 |

|  | Polymer | | | | |
|---|---|---|---|---|---|
|  | 6 | 7 | 8 | 9 | 10 |
| Modality MMV | monomodal | monomodal | monomodal | bimodal | monomodal |
| $M_w$ [g/mol] | 19300 | 16000 | 15200 | 20200 | 15100 |
| Pd [—] | 1.5 | 1.5 | 1.7 | 1.5 | 1.7 |
| α value [—] | 0.86 | 0.81 | 0.72 | 0.79 | 0.74 |
| Constituents 1000-500 D | 0 | 0 | 0 | 0 | 0 |
| Constituents < 500 D | 0 | 0 | 0 | 0 | 0 |

|  | Polymer | | | | |
|---|---|---|---|---|---|
|  | 11 | 12 | 13 | 14 | 15 |
| Modality MMV | monomodal | bimodal | monomodal | monomodal | bimodal |
| $M_w$ [g/mol] | 15900 | 15000 | 44700 | 50700 | 38000 |
| Pd [—] | 1.7 | 1.6 | 1.4 | 1.5 | 1.6 |
| α value [—] | 0.73 | 0.82 | 0.85 | 0.93 | 0.88 |
| Constituents 1000-500 D | 0 | 0 | 0 | 0 | 0 |
| Constituents < 500 D | 0 | 0 | 0 | 0 | 0 | c) Thermal Properties:

The determination of the softening point by the ring and ball method is carried out in accordance with DIN EN 1427.

The determination of the enthalpy of fusion, the glass transition temperature and the melting range of the crystalline fraction is carried out by differential scanning calorimetry (DSC) in accordance with DIN 53 765 from the second heating curve at a heating rate of 10 K/min. The point of inflection of the heat flow curve is taken as the glass transition temperature. An illustrative DSC thermogram for a polyolefin according to the invention may be found in the drawings.

|  | Polymer | | | | |
|---|---|---|---|---|---|
|  | 1 | 2 | 3 | 4 | 5 |
| Softening point (R&B) [° C.] | 130 | 118 | 80 | 97 | 116 |
| Number of melting peaks in first heating | 2 | 2 | 2 | 1 | 2 |
| First heating $T_M$ [° C.] | 120<br>129 | 108<br>116 | 75<br>92 | 111 | 47<br>108 |
| Number of melting peaks in second heating | 2 | 2 | 1 | 1 | 1 |
| Second heating $T_M$ [° C.] | 120<br>127 | 110<br>120 | 95 | 96 | 110 |
| Second heating: $\Delta H_M$ [J/g] | 30.6 | 35.1 | 10.3 | 10.1 | 54 |
| Second heating: $T_g$ [° C.] | −18 | −43 | −32 | −35 | −20 |
| Cold crystallization (peak at: [° C.]) | No (—) | No (—) | No (—) | No (—) | No (—) |
| Second heating: $T_M$ offset [° C.] | 140 | 128 | 100 | 125 | 118 |
| Δ [$T_M - T_{soft}$] [K] | 3 | 2 | 14 | 1 | 6 |

|  | Polymer | | | | |
|---|---|---|---|---|---|
|  | 6 | 7 | 8 | 9 | 10 |
| Softening point (R&B) [° C.] | 138 | 87 | 107 | 113 | 99 |
| Number of melting peaks in first heating | 2 | 3 | 1 | 2 | 1 |
| First heating $T_M$ [° C.] | 126<br>134 | 39<br>60<br>81 | 101 | 51<br>111 | 93 |
| Number of melting peaks in second heating | 1 | 1 | 1 | 2 | 1 |
| Second heating $T_M$ [° C.] | 129 | 80 | 99.5 | 76<br>87 | 92 |
| Second heating: $\Delta H_M$ [J/g] | 51 | 33 | 46.2 | 26.4 | 46 |
| Second heating: $T_g$ [° C.] | −9.5 | −40 | −19 | −38* | −20 |
| Second heating, cold crystallization (peak at: [° C.]) | No (—) | Yes (+12) | No (—) | No (—) | No (—) |
| Second heating: $T_M$ offset [° C.] | 140 | 90 | 111 | 96 | 105 |
| Δ [$T_M - T_{soft}$] [K] | 11 | 8 | 7.5 | 26 | 7 |

|  | Polymer | | | | |
|---|---|---|---|---|---|
|  | 11 | 12 | 13 | 14 | 15 |
| Softening point (R&B) [° C.] | 105 | 117 | 121 | 132 | 119 |
| Number of melting peaks in first heating | 2 | 3 | 2 | 2 | 3 |
| First heating $T_M$ [° C.] | 75<br>98 | 53<br>95<br>120 | 102<br>120 | 122<br>132 | 80<br>111<br>120 |
| Number of melting peaks in second heating | 3 | 2 | 2 | 2 | 3 |
| Second heating $T_M$ [° C.] | 68<br>81 | 108<br>120 | 105<br>120 | 122<br>130 | 88<br>06 |

-continued

|  |  |  |  |  |  |
|---|---|---|---|---|---|
|  | 91 |  |  |  | 113 |
| Second heating: $\Delta H_M$ [J/g] | 41.9 | 36.4 | 14.9 | 28 | 26.1 |
| Second heating: $T_g$ [° C.] | −38 | −26 | −40 | −21 | −34 |
| Second heating, cold crystallization (peak at: [° C.]) | Yes (−9 & +12) | No (—) | No (—) | No (—) | No (—) |
| Second heating: $T_M$ offset [° C.] | 102 | 126 | 131 | 135 | 125 |
| $\Delta [T_M - T_{soft}]$ [K] | 14 | 3 | 1 | 2 | 6 |

*Glass transition step only weakly defined d) Adhesive Properties

The determination of the adhesive shear strength is carried out in accordance with DIN EN 1465. The polymer samples are melted for one hour at 190° C. in a drying oven under a protective gas atmosphere (e.g. nitrogen, argon, etc.) and subsequently applied to a test specimen at a temperature of 170° C. (by means of a temperature sensor). The test specimen is brought into contact with a further test specimen of the same material, within 20 seconds, with a simple overlap over an area of 4 cm$^2$ and pressed together for 5 minutes by means of a weight of 2 kg. Protruding adhesive polymer is removed. The adhesively bonded specimen is subsequently stored for 7 days at 20° C./65% relative atmospheric humidity in a temperature- and humidity-controlled cabinet and its mechanical properties are subsequently tested by means of a tensile test. Test materials used are untreated beech wood (thickness: 2 mm), untreated isotactic polypropylene (thickness: 2 mm, isotactic polypropylene, "PP-DWST"/manufacturer: Simona AG), untreated polyethylene (thickness: 2 mm; "PE-HWST" manufacturer: Simona AG) and untreated poly(vinyl chloride) (thickness: 2 mm, unplasticized PVC "Kommadur ES"; manufacturer: Kömmerling-Profine)).

|  | Polymer | | | | | |
|---|---|---|---|---|---|---|
|  | 1 | 2 | 3 | 4 | 5 | 6 |
| Needle penetration [0.1 mm] | 2 | 2 | 4 | 11 | 2 | 2 |
| Melt viscosity at 190° C. [mPa * s] | 2500 | 1200 | 9700 | 17000 | 5400 | 1100 |
| Adhesive shear strength PP/PP [MPa] | 1.45 | 1 | 1.1 | 2 | 1.45 | 0.55 |
| Adhesive shear strength beech/beech [MPa] | 2.35 | 2.25 | 3.3 | 1.9 | 2.9 | 2.9 |
| Adhesive shear strength PE/PE [MPa] | 0.05 | 0.15 | 0.2 | 0.36 | 0.2 | n.d. |
| Adhesive shear strength PVC/PVC [MPa] | 0.35 | 0.3 | 0.35 | 0.6 | 0.3 | n.d. |
| Tensile strength [MPa] | 7.1 | 5.8 | 18 | 2.3 | 15.2 | 12.3 |
| Elongation at break [%] | 20 | 10 | 430 | 430 | 10 | 10 |
| Xylene solubility [% by mass] | 48 | 85 | 100 | 100 | 38 | 100 |
| THF solubility [% by mass] | 16 | 28.5 | 99.5 | 100 | 2 | 99.5 |

|  | Polymer | | | | | |
|---|---|---|---|---|---|---|
|  | 7 | 8 | 9 | 10 | 11 | 12 |
| Needle penetration [0.1 mm] | 7 | 1 | 2 | 1 | 1 | 6 |
| Melt viscosity at 190° C. [mPa * s] | 630 | 600 | 620 | 600 | 680 | 630 |
| Adhesive shear strength PP/PP [MPa] | 0.4 | 0.35 | 0.3 | 0.35 | 0.25 | 0.6 |
| Adhesive shear strength beech/beech [MPa] | 1.1 | 0.75 | 1.3 | 0.85 | 1.65 | 1.70 |
| Adhesive shear strength PE/PE [MPa] | 0.15 | 0.1 | 0.07 | 0.12 | 0.08 | 0.15 |
| Adhesive shear strength PVC/PVC [MPa] | 0.21 | 0.2 | 0.12 | 0.18 | 0.17 | n.d. |
| Tensile strength [MPa] | 1.1 | 1.2 | 1.5 | 1.3 | 1.75 | 2.1 |
| Elongation at break [%] | 10 | 10 | 15 | 10 | 20 | 10 |
| Xylene solubility [% by mass] | 99 | 96.6 | 99.4 | 99.0 | 97.9 | 84.9 |
| THF solubility [% by mass] | 99.4 | 97.5 | 10.4 | 98.6 | 32.7 | 70.2 |

|  | Polymer | | |
|---|---|---|---|
|  | 13 | 14 | 15 |
| Needle penetration [0.1 mm] | 6 | 4 | 7 |
| Melt viscosity at 190° C. [mPa * s] | 21000 | 29000 | 8000 |
| Adhesive shear strength PP/PP [MPa] | 3 | 1.6 | 2.5 |
| Adhesive shear strength beech/beech [MPa] | 3 | 4.85 | 2.5 |

-continued

| | | | |
|---|---|---|---|
| Adhesive shear strength PE/PE [MPa] | 0.3 | 0.17 | 0.3 |
| Adhesive shear strength PVC/PVC [MPa] | 0.5 | 0.8 | 0.3 |
| Tensile strength [MPa] | 6.5 | 8.1 | 4 |
| Elongation at break [%] | 800 | 75 | 40 |
| Xylene solubility [% by mass] | 99.3 | 59.6 | 91 |
| THF solubility [% by mass] | 92 | 25.4 | 74 | e) Rheological Properties

Examples of the frequency dependence of complex viscosity, storage modulus and loss modulus of a polyolefin according to the invention may be found in the drawings.

Illustrated Formulations for Nap and Filament Binding of Raw Carpet for Testing of Pile Binding of Hot Melt Coatings Based on Polyolefin Formulations According to the Invention for Tufted Carpets Procedure:

After melting of the polymers according to the invention at 190° C. in a drying oven under protective gas atmosphere (e.g. nitrogen, argon, etc.) for one hour, the formulation constituents are added, melted if appropriate and the mixture is then mixed until homogeneous by means of a suitable mixing apparatus (e.g. on a hotplate using an IKA stirrer with kneader). The materials properties of the formulations are determined, and the raw carpet is subsequently coated by multiroller application and application by means of a slit die and doctor blade.

| | | Experiment No. | | | | |
|---|---|---|---|---|---|---|
| | | A | B | C | D | E |
| Polymer 1 according to the invention (viscosity at 190° C.: 2500 mPa * s Penetration: 20.1 mm, EP: 130° C.) | % by weight | 55 | 60 | 45 | 50 | 40 |
| VESTOPLAST ® 750, from Evonik Degussa GmbH | % by weight | | | 5 | 5 | 5 |
| ESCOREZ 5300, from ExxonMobil Chemical | % by weight | 35 | 35 | 40 | 40 | 40 |
| VESTOWAX ® A415, from Evonik Degussa GmbH | % by weight | 10 | 5 | 10 | 5 | 5 |
| Mikrosöhl (chalk) | % by weight | | | | | 10 |
| Softening point (R&B) | ° C. | 133 | 128 | 122 | 129 | 131 |
| Needle penetration | 0.1 mm | 4 | 2 | 5 | 7 | 3 |
| Melt viscosity at 190° C. | mPa * s | 2100 | 2340 | 2430 | 2510 | 3100 |

Testing of Pile Binding of Hot Melt Coatings Based on Polyolefin Formulations According to the Invention for Tufted Carpets in Three different Application Forms Precoating on a polyamide tufting carpet backing 620 g/m²
Multiroller application

| | | Experiment No. | | | | |
|---|---|---|---|---|---|---|
| | | A | B | C | D | E |
| Coating weight | g/m² | 250 | 270 | 290 | 300 | 310 |
| Nap tear-out resistance | kg | 6.1 | 6.3 | 6.1 | 5.7 | 6.2 |

-continued

Precoating on a polyamide tufting carpet backing 620 g/m²
Multiroller application

| | | Experiment No. | | | | |
|---|---|---|---|---|---|---|
| | | A | B | C | D | E |
| Testing using the tread wheel apparatus by a method based on the Lisson system EN 1963 | | | | | | |
| Visual assement after number of tread frequencies | 750 | ++ | ++ | ++ | ++ | ++ |
| | 1000 | ++ | ++ | ++ | ++ | ++ |
| | 1500 | ++ | ++ | ++ | ++ | ++ |
| | 2300 | ++ | ++ | +/++ | ++ | ++ |

Application using a slit die

| | | Experiment No. | | | | |
|---|---|---|---|---|---|---|
| | | A | B | C | D | E |
| Coating weight | g/m² | 400 | 430 | 400 | 390 | 390 |
| Nap tear-out resistance | kg | 6.1 | 5.6 | 6.3 | 6.3 | 6.2 |
| Testing using the tread wheel apparatus by a method based on the Lisson system EN 1963 | | | | | | |
| Visual assement after number of tread frequencies | 750 | ++ | ++ | ++ | ++ | ++ |
| | 1000 | ++ | ++ | ++ | ++ | ++ |
| | 1500 | ++ | +/++ | ++ | ++ | ++ |
| | 2300 | +/++ | +/++ | ++ | ++ | ++ |

| Application using a doctor blade | | | | | | |
|---|---|---|---|---|---|---|
| | | Experiment No. | | | | |
| | | A | B | C | D | E |
| Coating weight | g/m² | 390 | 410 | 400 | 360 | 360 |
| Nap tear-out resistance Testing using the tread wheel apparatus by a method based on the Lisson system EN 1963 | kg | 5.9 | 5.7 | 5.8 | 6.2 | 6.2 |
| Visual assement after number of tread frequencies | 750 | ++ | ++ | ++ | ++ | ++ |
| | 1000 | ++ | ++ | ++ | ++ | ++ |
| | 1500 | ++ | +/++ | +/++ | ++ | ++ |
| | 2300 | ++ | +/++ | +/++ | ++ | ++ |

○ moderate
+ good
++ very good

The invention claimed is:

1. A polyolefin for floor coverings, wherein the polyolefin is a copolymer of ethylene, propylene and 1-butene comprising ethylene and propylene in a total amount of not more than 20% by mass and 80-98% by mass of 1-butene, with the sum of the proportions being 100% by mass, wherein the triad distribution for 1-butene triads determined by $^{13}$C-NMR has an isotactic proportion of 10-98% by mass, an atactic proportion of 1-85% by mass and a syndiotactic proportion of not more than 20% by mass, wherein the polyolefin has at least one melting peak in the DSC at a temperature in the range of 30-95° C. and wherein the isotactic proportion of the propene triads is 75-82%.

2. The polyolefin according to claim 1, wherein the floor coverings are carpets or artificial lawns.

3. An adhesive comprising the polyolefin according to claim 1.

4. The adhesive according to claim 3, in the form of a hot melt adhesive formulation.

5. A heavy coating composition comprising the polyolefin according to claim 1.

6. The adhesive according to claim 3, wherein the adhesives additionally contain inorganic and/or organic fillers, inorganic and/or organic pigments, synthetic and/or natural resins, inorganic and/or organic, synthetic and/or natural polymers, inorganic and/or organic, synthetic and/or natural fibres, inorganic and/or organic stabilizers, inorganic and/or organic flame retardants, resins, amorphous poly(α-olefins), polymers having polar groups, polymers based on ethylene, butadiene, styrene and/or isoprene, elastomeric polymers based on ethylene, propylene, acrylonitrile, a diene and/or a cyclic diene, styrene, waxes, one or more synthetic or natural oils and/or UV-active substances.

7. A polyolefin composition comprising the polyolefin according to claim 1, wherein the polyolefin composition is in the form of at least one of a nap binder, a filament binder and a rear-side coating.

8. A floor covering comprising the polyolefin according to claim 1 in an amount of from 20 to 1500 g/m².

9. The polyolefin according to claim 1, wherein the floor coverings are based on natural and/or synthetic fibres.

10. The polyolefin according to claim 1, wherein the needle penetration of the polyolefin is not more than 35*0.1 mm.

11. The polyolefin according to claim 1, wherein the polyolefin has a complex melt viscosity at a temperature of 190° C., a deformation of not more than 1% and a measurement frequency of 1 Hz of from 600 to 400000 mPa*s.

12. The polyolefin according to claim 1, wherein the glass transition temperature of the polyolefin determined by means of DSC is not more than −5° C.

13. A polyolefin hot melt adhesive for nap and/or filament binding, wherein the polyolefin is a copolymer of ethylene, propylene and 1-butene comprising ethylene and propylene in a total amount of not more than 20% by mass and 80-98% by mass of 1-butene, with the sum of the proportions being 100% by mass, and wherein the triad distribution for 1-butene triads determined by $^{13}$C-NMR has an isotactic proportion of 10-98% by mass, an atactic proportion of 1-85% by mass and a syndiotactic proportion of not more than 20% by mass, wherein the polyolefin has at least one melting peak in the DSC at a temperature in the range of 30-95° C. and wherein the isotactic proportion of the propene triads is 75-82%.

14. A polyolefin heavy coating composition for the production of floor coverings, wherein the polyolefin is a copolymer of ethylene, propylene and 1-butene comprising ethylene and propylene in a total amount of not more than 20% by mass of 1-butene and 80-98% by mass, with the sum of the proportions being 100% by mass, and wherein the triad distribution for 1-butene triads determined by $^{13}$C-NMR has an isotactic proportion of 10-98% by mass, an atactic proportion of 1-85% by mass and a syndiotactic proportion of not more than 20% by mass, wherein the polyolefin has at least one melting peak in the DSC at a temperature in the range of 30-95° C. and wherein the isotactic proportion of the propene triads is 75-82%.

15. A floor covering comprising a polyolefin, wherein the polyolefin is a copolymer of ethylene, propylene and 1-butene comprising ethylene and propylene in a total amount of not more than 20% by mass and 80-98% by mass of 1-butene the sum of the proportions being 100% by mass, and wherein the triad distribution for 1-butene triads determined by $^{13}$C-NMR has an isotactic proportion of 10-98% by mass, an atactic proportion of 1-85% by mass and a syndiotactic proportion of not more than 20% by mass, wherein the polyolefin has at least one melting peak in the DSC at a temperature in the range of 30-95° C. and wherein the isotactic proportion of the propene triads is 75-82%.

16. The floor covering according to claim 15, wherein said floor covering is a carpet or artificial lawn.

17. The heavy coating composition according to claim 5, wherein the heavy coating compositions additionally contain inorganic and/or organic fillers, inorganic and/or organic pigments, synthetic and/or natural resins, inorganic and/or organic, synthetic and/or natural polymers, inorganic and/or organic, synthetic and/or natural fibres, inorganic and/or organic stabilizers, inorganic and/or organic flame retardants, resins, amorphous poly(α-olefins), polymers having polar groups, polymers based on ethylene, butadiene, styrene and/or isoprene, elastomeric polymers based on ethylene, propylene, acrylonitrile, a diene and/or a cyclic diene, styrene, waxes, one or more synthetic or natural oils and/or UV-active substances.

* * * * *